(12) United States Patent
Gordon et al.

(10) Patent No.: US 7,519,982 B1
(45) Date of Patent: Apr. 14, 2009

(54) EFFICIENT DELIVERY OF INTERACTIVE PROGRAM GUIDE USING DEMAND-CAST

(75) Inventors: Donald F. Gordon, Los Altos, CA (US); Sadik Bayrakeri, Foster City, CA (US); John P. Comito, Redwood City, CA (US); Jeremy S. Edmonds, Castro Valley, CA (US)

(73) Assignee: Comcast IP Holdings I, LLC, Wilmington, DE (US)

( * ) Notice: Subject to any disclaimer, the term of this patent is extended or adjusted under 35 U.S.C. 154(b) by 1257 days.

(21) Appl. No.: 09/687,662

(22) Filed: Oct. 12, 2000

Related U.S. Application Data

(63) Continuation-in-part of application No. 09/686,739, filed on Oct. 10, 2000, now Pat. No. 6,754,271, which is a continuation-in-part of application No. 09/466,990, filed on Dec. 10, 1999, now Pat. No. 6,614,843, and a continuation-in-part of application No. 09/428,066, filed on Oct. 27, 1999, now Pat. No. 6,651,252, and a continuation-in-part of application No. 09/384,394, filed on Aug. 27, 1999, now Pat. No. 6,621,870, which is a continuation-in-part of application No. 09/293,535, filed on Apr. 15, 1999, now Pat. No. 6,584,153, application No. 09/687,662, which is a continuation-in-part of application No. 09/539,228, filed on Mar. 30, 2000, now abandoned, which is a continuation-in-part of application No. 09/524,854, filed on Mar. 14, 2000, now Pat. No. 7,127,737.

(60) Provisional application No. 60/238,480, filed on Oct. 6, 2000.

(51) Int. Cl.
  *G06F 3/00* (2006.01)
  *H04N 5/445* (2006.01)

(52) U.S. Cl. .............................. 725/54; 725/39; 725/43; 725/50; 725/102

(58) Field of Classification Search .............. 725/30–61
See application file for complete search history.

(56) References Cited

U.S. PATENT DOCUMENTS 3,754,211 A * 8/1973 Rocher et al. ............... 714/749

(Continued)

FOREIGN PATENT DOCUMENTS

| EP | 0 758 833 A | 2/1997 |
| EP | 0 921 682 A | 6/1999 |
| EP | 0 946 060 A | 9/1999 |
| EP | 01 90 5040 | 3/2006 |

*Primary Examiner*—Christopher Kelley
*Assistant Examiner*—Reuben M. Brown
(74) *Attorney, Agent, or Firm*—Wall & Tong, LLP

(57) ABSTRACT

Techniques to efficiently deliver interactive program guide (IPG). In one aspect, if an IPG page is requested by a viewer and not already transmitted, only the guide portion for the requested page is sent instead of the entire page. The requested page includes a guide portion that is specific to the requested page and a background portion that is common for a number of pages. The background portion can be continually broadcasted by the head-end. The requesting terminal is thus able to regenerate the requested page based on the demand-casted guide portion (i.e., transmitted upon request) and the continually broadcasted background portion. Alternatively, the entire requested page can be transmitted. In another aspect, instead of sending the requested guide portion continually, the guide portion is sent a limited number of times (e.g., only once, upon receiving the request). Since the guide portion for any particular page is normally static and does not change over time, sending the guide portion a limited number of times (e.g., once) is typically sufficient and greatly reduces bandwidth usage.

21 Claims, 21 Drawing Sheets

U.S. PATENT DOCUMENTS

| | | | |
|---|---|---|---|
| 4,600,921 A * | 7/1986 | Thomas ..................... 340/5.74 |
| 5,038,211 A * | 8/1991 | Hallenbeck ................... 725/46 |
| 5,526,034 A | 6/1996 | Hoarty et al. |
| 5,600,378 A * | 2/1997 | Wasilewski ................. 348/468 |
| 5,657,072 A * | 8/1997 | Aristides et al. ............... 725/46 |
| 5,715,515 A * | 2/1998 | Akins et al. ................. 725/142 |
| 5,734,589 A | 3/1998 | Kostreski et al. |
| 5,734,853 A * | 3/1998 | Hendricks et al. ........... 715/716 |
| 5,801,753 A * | 9/1998 | Eyer et al. .................... 725/50 |
| 5,844,620 A * | 12/1998 | Coleman et al. .............. 725/54 |
| 5,850,218 A | 12/1998 | LaJoie et al. |
| 5,917,830 A * | 6/1999 | Chen et al. ................... 370/487 |
| 5,940,738 A | 8/1999 | Rao et al. |
| 6,025,837 A * | 2/2000 | Matthews, III et al. ....... 715/721 |
| 6,177,931 B1 * | 1/2001 | Alexander et al. ............ 725/52 |
| 6,198,478 B1 | 3/2001 | Ota et al. |
| 6,754,905 B2 * | 6/2004 | Gordon et al. ................. 725/38 |
| 7,065,709 B2 * | 6/2006 | Ellis et al. .................... 715/719 |
| 7,096,484 B2 * | 8/2006 | Mao et al. ...................... 725/52 |
| 7,370,342 B2 * | 5/2008 | Ismail et al. ................... 725/46 |
| 2002/0035728 A1 * | 3/2002 | Fries ........................... 725/68 |
| 2002/0049971 A1 * | 4/2002 | Augenbraun et al. .......... 725/39 |

\* cited by examiner

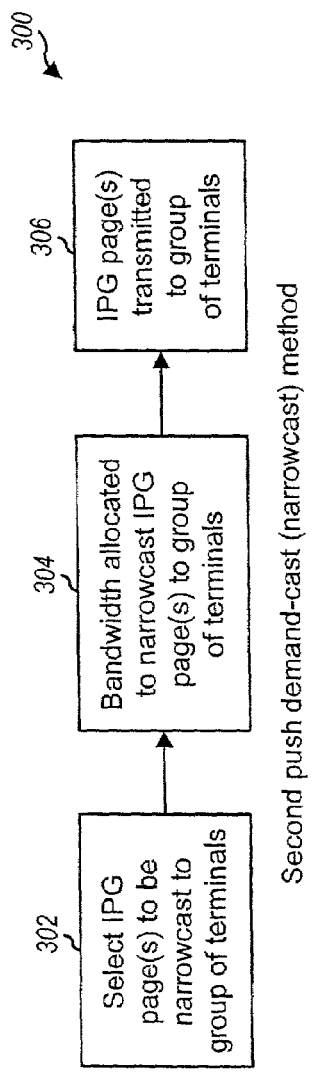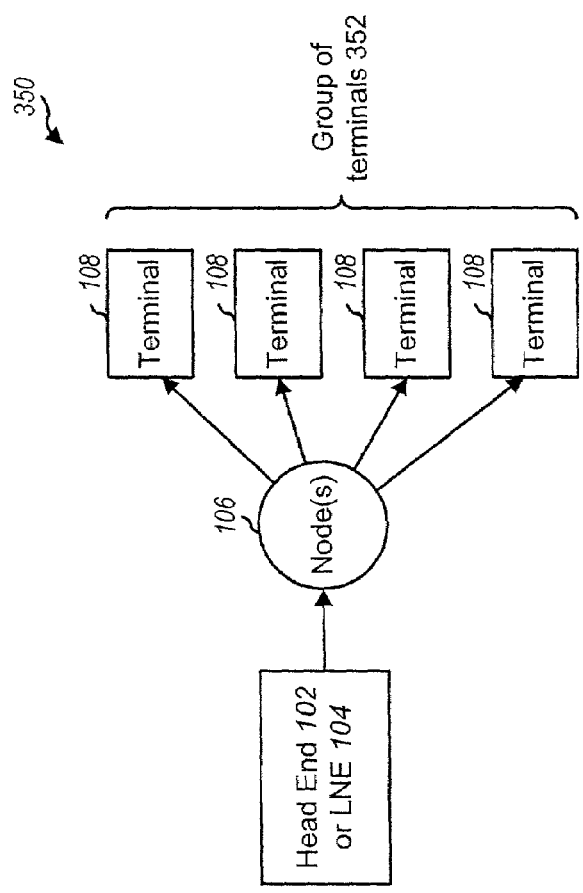

First pull demand-cast (pointcast) method

First pull demand-cast (pointcast) topology

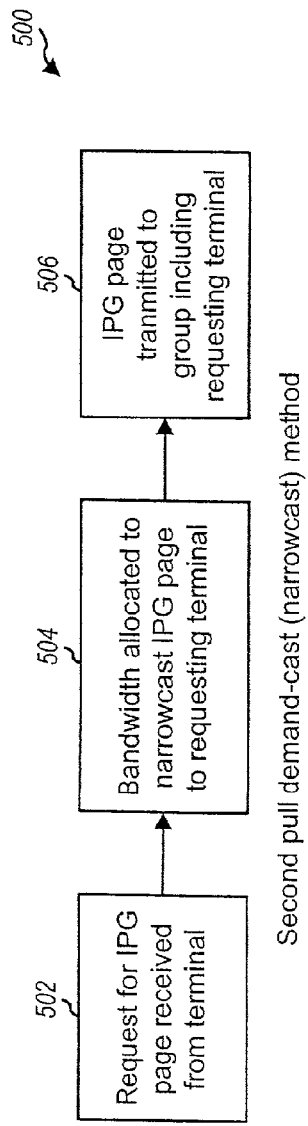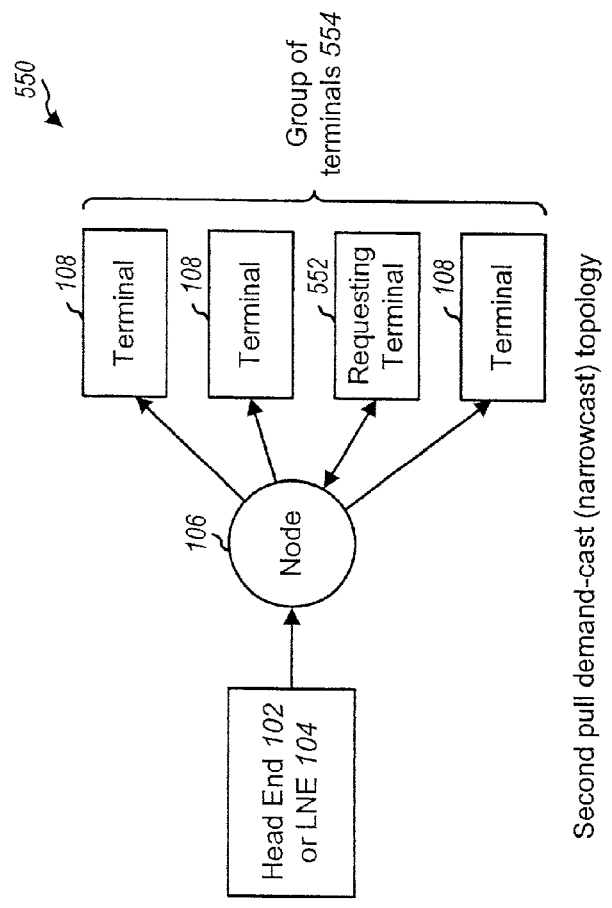

Third pull demand-cast (pointcast sharing) method

Third pull demand-cast (pointcast sharing) topology

TSG-to-Terminal Communication:

Contents of Demand-Cast Index Table

| |
|---|
| table version number (incremented when table content changes) |
| list of available demand-cast streams |
| IP address for the source TSG |
| MUX channel number within the source TSG |
| time-of-day and day-of-week |

*FIG. 14A*

Terminal-to-SM Communication:

Message Content

| |
|---|
| demand-cast stream ID |
| terminal ID |
| IP address for the source TSG |
| MUX channel number within the source TSG |
| message information (acquisition, release, or request) |

*FIG. 14B*

SM to-TSG Communication:

Message Content

| demand-cast stream ID |
|---|
| MUX channel number within the source TSG |
| message/command (stream released, stream requested, or reset) |

*FIG. 14C*

TSG-to-SM Communication:

Message Content

| demand-cast stream ID |
|---|
| MUX channel number within the source TSG |
| IP address for the source TSG |
| acknowledgement (of stream release, of stream request, or of reset) |

*FIG. 14D*

A: "acquired" streams are in MUX and in demand-cast index table

R: "released" streams are in MUX and in demand-cast index table. They can be turned into "passive" streams.

P: "passive" streams are technically released. They are not in the demand-cast index table. They are removable.

| A | A | A | A | R | R | R | R |
|---|---|---|---|---|---|---|---|
| A | A | A | A | R | R | R | R |
| A | A | A | A | R | R | R | R |
| A | A | R | R | R | R | R | P |
| A | A | R | R | R | R | R | P |

"active" demand-cast streams are in IPG multiplex

TSG Demand-cast Stream Status

*FIG. 15*

EFFICIENT DELIVERY OF INTERACTIVE PROGRAM GUIDE USING DEMAND-CAST

CROSS-REFERENCES TO RELATED APPLICATIONS

This application claims the benefit of U.S. provisional Application Ser. No. 60/238,480, entitled "EFFICIENT DELIVERY OF INTERACTIVE PROGRAM GUIDE USING DEMAND-CAST," filed Oct. 6, 2000, which is incorporated herein by reference in its entirety for all purposes.

This application is further a continuation-in-part of U.S. patent application Ser. No. 09/686,739, entitled "TEMPORAL SLICE PERSISTENCE METHOD and APPARATUS FOR DELIVERY OF INTERACTIVE PROGRAM GUIDE," filed Oct. 10, 2000 now U.S. Pat. No. 6,754,271, which is a continuation-in-part of U.S. patent application Ser. No. 09/466,990, entitled "STREAM INDEXING FOR DELIVERY OF INTERACTIVE PROGRAM GUIDE," filed Dec. 10, 1999 now U.S. Pat. No. 6,614,843, which is a continuation-in-part of Ser. No. 09/293,535, entitled "IMPROVED DATA STRUCTURE AND METHODS FOR PROVIDING AN INTERACTIVE PROGRAM GUIDE", filed Apr. 15, 1999 now U.S. Pat. No. 6,584,153, Ser. No. 09/384,394, entitled "METHOD AND APPARATUS FOR COMPRESSING VIDEO SEQUENCES," filed Aug. 27, 1999 now U.S. Pat. No. 6,621,870, and Ser. No. 09/428,066 filed Oct. 27, 1999 now U.S. Pat. No. 6,651,252, entitled "METHOD AND APPARATUS FOR TRANSMITTING VIDEO AND GRAPHICS IN A COMPRESSED FORM."

This application is further a continuation-in-part of U.S. patent application Ser. No. 09/539,228, entitled "MESSAGING PROTOCOL FOR DEMAND-CAST SYSTEM AND BANDWIDTH MANAGEMENT," filed Mar. 30, 2000 now abandoned, which is a continuation-in-part of U.S. patent application Ser. No. 09/524,854, entitled "BANDWIDTH MANAGEMENT TECHNIQUES FOR DELIVERY OF INTERACTIVE PROGRAM GUIDE," filed Mar. 14, 2000 now U.S. Pat. No. 7,127,737.

The above-identified related applications are all assigned to the assignee of the present invention and incorporated herein by reference in their entirety for all purposes. The detailed description for application Ser. No. 09/686,739 is hereby attached as Exhibit A.

BACKGROUND OF THE INVENTION

The present invention relates to communications systems in general. More specifically, the invention relates to techniques to efficiently deliver interactive program guide (IPG) in a server-centric system.

Over the past few years, the television industry has seen a transformation in a variety of techniques by which its programming is distributed to consumers. Cable television systems are doubling or even tripling system bandwidth with the migration to hybrid fiber coax (HFC) cable plant. Customers unwilling to subscribe to local cable systems have switched in high numbers to direct broadcast satellite (DBS) systems. And, a variety of other approaches have been attempted focusing primarily on high bandwidth digital technologies, intelligent two way set top terminals, or other methods of trying to offer service differentiated from standard cable and over the air broadcast systems.

With this increase in bandwidth, the number of programming choices has also increased. Leveraging off the availability of more intelligent set top terminals, several companies such as Starsight Telecast Inc. and TV Guide, Inc. have developed elaborate systems for providing an interactive listing of a vast array of channel offerings, expanded textual information about individual programs, and the ability to look forward to plan television viewing as much as several weeks in advance.

With this increase in the quantity of programming, it is a challenge to deliver program guide data to viewers in an efficient and effective manner. A large amount of resources (e.g., bandwidth) would normally be needed to continually transmit, for example, two weeks of programming for 200 channels. Therefore, efficient and effective techniques to deliver interactive program guide to a large number of viewers are highly desirable.

SUMMARY OF THE INVENTION

The invention provides various techniques to deliver interactive program guide (IPG). In accordance with one aspect of the invention, if an IPG page is requested by a viewer and if the requested IPG page is not already transmitted, only the guide portion for the requested IPG page is sent instead of the entire picture. The requested IPG page includes a guide portion that is specific to the requested IPG page and a background portion that is common for a number of IPG pages. In an embodiment, the background portion is continually broadcasted by the head-end. Thus, the requesting terminal is able to regenerate the requested IPG page based on the demand-casted guide portion (which is transmitted upon request) and the already broadcasted background portion. Alternatively, the entire picture for the requested IPG page can be transmitted in response to the request.

In accordance with another aspect of the invention, instead of sending the requested guide portion continually (e.g., once for each GOP), the guide portion is sent a limited number of times (e.g., only once, upon receiving the request from the terminal). Since the guide portion for any particular IPG page is normally static and does not change over time, sending the guide portion a limited number of times (e.g., once) is typically sufficient and greatly reduces bandwidth usage.

In an embodiment, for such limited number of guide portion delivery, and considering the error-prone networks and stream losses at the receiving terminal, a messaging scheme between the receiving terminal and the head end is introduced to assure the delivery of the requested guide portion to the terminal.

Various schemes can be used to encode and transmit the requested IPG, and various decoding schemes can be used to regenerate the requested IPG page. Some of such encoding schemes are described in the attached Exhibit A.

The foregoing, together with other aspects of this invention, will become more apparent when referring to the following specification, claims, and accompanying drawings.

BRIEF DESCRIPTION OF THE DRAWINGS

The teachings of the invention can be readily understood by considering the following detailed description in conjunction with the accompanying drawings.

FIGS. 2-6 are diagrams of various methods and topologies for demand-casting interactive program guide (IPG) pages in accordance with embodiments of the invention;

FIGS. 3A and 3B are respectively a flow diagram and a topology for a second push method for demand-casting IPG pages in accordance with an embodiment of the invention;

FIGS. 5A and 5B are respectively a flow diagram and a topology for a second pull method for demand-casting IPG pages in accordance with an embodiment of the invention;

FIGS. 14A-14D are diagrams of an embodiment of the messaging between the terminal, the session manager, and the transport stream generator;

FIG. 15 is a diagram of an example showing the status of active demand-cast streams in an IPG multiplex;

DESCRIPTION OF THE SPECIFIC EMBODIMENTS

A. Illustrative Communications Network

Figure 1:
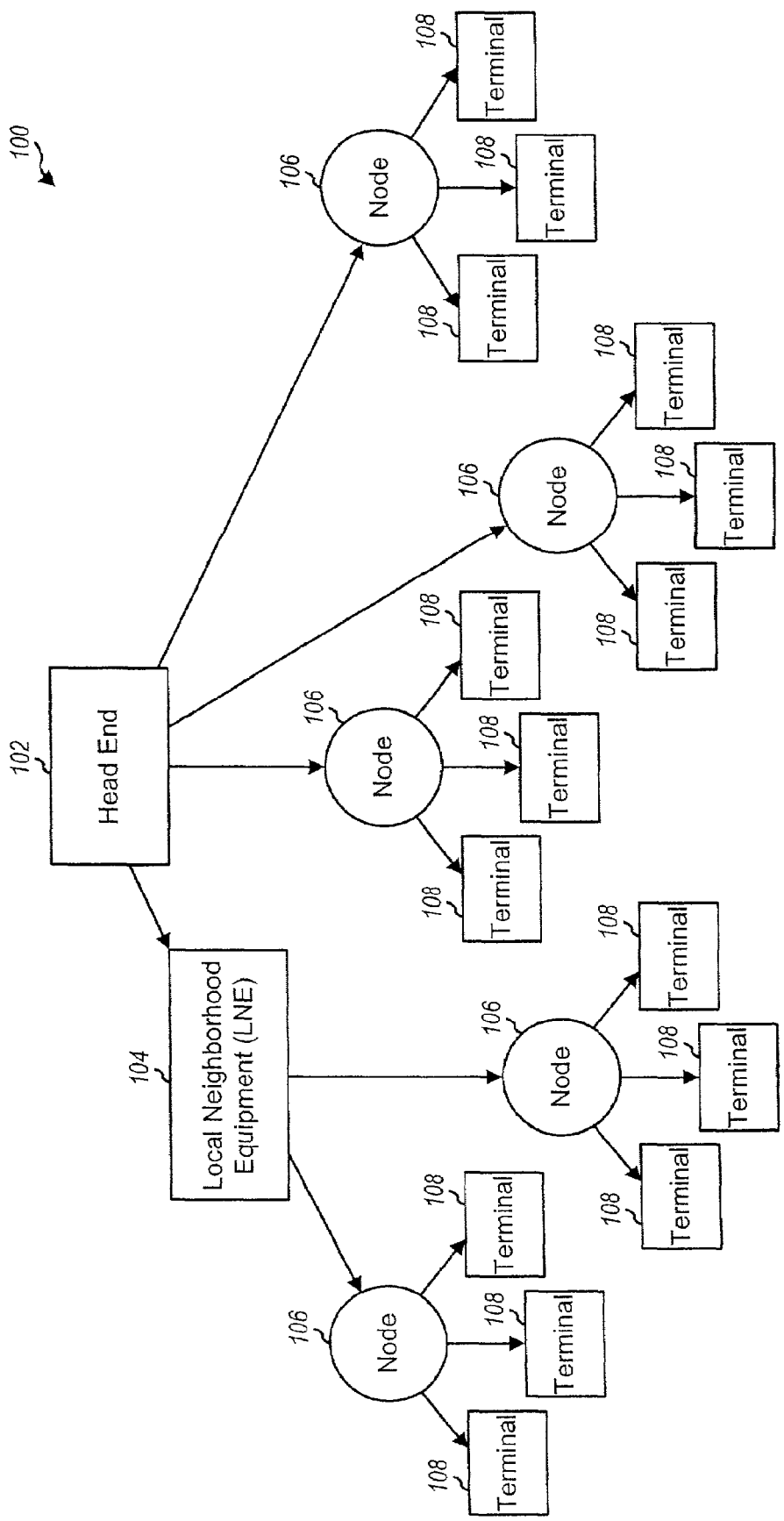
FIG. 1 is a diagram of an illustrative communications network for distributing video sequences to a number of terminals in accordance with an embodiment of the invention.

FIG. 1 is a diagram of an illustrative communications network 100 for distributing video sequences to a number of terminals in accordance with an embodiment of the invention. Communications network 100 may be a cable distribution network, but other types of distribution networks may also be used and are within the spirit and scope of the invention.

As shown in FIG. 1, communications network 100 includes one or more head-ends (HE) 102, one or more centers for local neighborhood equipment (LNE) 104, a number of distribution nodes 106, and a number of terminals 108. Local neighborhood equipment 104 may be located, for example, at remote hubs of a cable distribution network. Terminals 108 may be user terminals, interactive set-top terminals (STT), or other devices with interactive functionalities.

B. Example Methods and Topologies

As used herein, "demand-cast" refers to the process of managing and delivering content to one or more users in response to user demand for the content. "Broadcast" refers to the process of managing and delivering content to a number of users on a continual basis. "Pointcast" refers to the process of managing and delivering content to a particular user. And "Narrowcast" refers to the process of managing and delivering content to a group of users.

FIGS. 2-6 are diagrams of various methods and topologies for demand-casting interactive program guide (IPG) pages. These methods and topologies are presented for purposes of edification and are not meant to limit the scope of the invention.

1. First Push Method for Demand-Cast

Figure 2A:
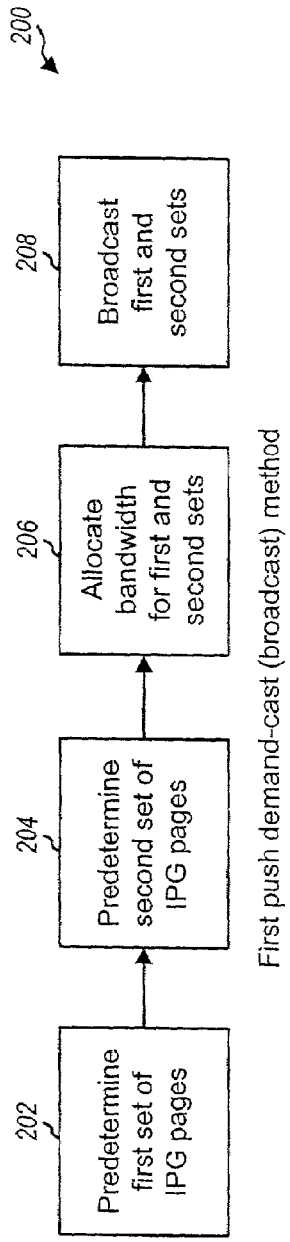
FIGS. 2A and 2B are respectively a flow diagram and a topology for a first push method for demand-casting IPG pages in accordance with an embodiment of the invention.

FIG. 2A is a flow diagram showing a first push method 200 for demand-casting IPG pages in accordance with an embodiment of the invention. As described below, method 200 includes four steps.

In a first step 202, a first set of IPG pages to be broadcast is predetermined. The first set of IPG pages may comprise video sequences, for example, for a current time period. For instance, if the current time is 1:07 pm, then the current time period may include programming from 1:00 pm to 2:30 pm, assuming a 90-minute time period.

In a second step 204, a second set of IPG pages to be broadcast is predetermined. The second set of IPG pages may comprise video sequences, for example, for a prime time period. Such prime time period is a time period during which a large number of viewers typically watch TV programming. For example, the prime time period may include programming from 6:00 pm to 9:00 pm.

In a third step 206, the bandwidth to broadcast the first and second sets of IPG pages is allocated by the distribution system for that purpose. For example, as described below in more detail, a bandwidth manager (BWM) within head-end 102 and/or local neighborhood equipment 104 allocates the necessary bandwidth within the in-band network to broadcast the first and second sets of IPG pages to the terminals. If the first and second sets overlap, then only the non-redundant video sequences need to be broadcast, and only enough bandwidth to broadcast the non-redundant video sequences needs to be allocated. Such situation may occur, for example, when the current time period overlaps the prime time period.

In a fourth step 208, the IPG pages of the first and second sets are broadcast to terminals 108 within the broadcast range. The broadcast range may comprise all terminals 108 downstream from head-end 102 or local neighborhood equipment 104. Only non-redundant content needs to be broadcast, and the broadcast is achieved within the allocated in-band bandwidth.

Figure 2B:
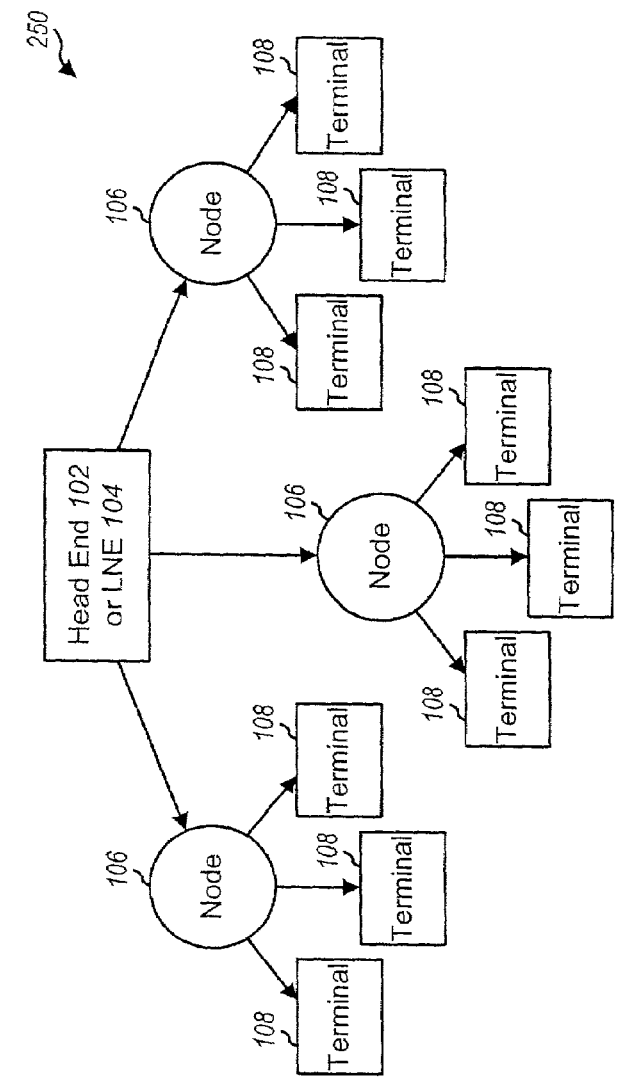

FIG. 2B depicts a first push topology 250 for demand-casting IPG pages in accordance with an embodiment of the invention. Topology 250 corresponds to the first push method 200 of FIG. 2A. As shown in FIG. 2B, the IPG pages are transmitted from head-end 102 or local neighborhood equipment 104 downstream within communications network 100. As shown in FIG. 2B, the broadcast is "pushed" from head-end 102 or line neighborhood equipment 104 to distribution nodes 106 and finally to a number of terminals 108.

2. Second Push Method for Demand-Cast

FIG. 3A is a flow diagram showing a second push method 300 for demand-casting IPG pages in accordance with an embodiment of the invention. As described below, method 300 includes three steps.

In a first step 302, one or more IPG pages are selected to be narrowcast to a group of terminals 352. For example, the group of terminals may be a group comprising a high concentration of users with a particular ethnicity or special interest, and the selected IPG page(s) may comprise programming targeted to that ethnic or special interest group. As another example, the group of terminals may comprise terminals in a school campus or business, and the selected IPG page(s) may comprise class instruction or other targeted material. The group of terminals may include terminals in one geographic area or terminals dispersed among different geographic areas but linked, for example, via a network group address.

In a second step 304, the bandwidth to narrowcast the selected IPG page(s) is allocated by the distribution system for that purpose. For example, as described below in more detail, the bandwidth manager (BWM) within head-end 102 and/or local neighborhood equipment 104 allocates the necessary bandwidth within the in-band network to narrowcast the selected IPG page(s) to the group of terminals. If the requested IPG page(s) are already being broadcast as shown in FIGS. 2A and 2B, then no additional bandwidth for a narrowcast needs be allocated.

In a third step 306, the selected IPG page(s) are narrowcast to the group of terminals. The narrowcast need only to be received by terminals within the group of terminals 352 and does not need to be received by other terminals. The narrowcast is sent downstream from head-end 102 or local neighborhood equipment 104 to the group of terminals. The narrowcast is achieved within the allocated in-band bandwidth. If the requested IPG page(s) are already being broadcast as shown in FIGS. 2A and 2B, then the narrowcast needs not be performed.

FIG. 3B depicts a second push topology 350 for demand-casting IPG pages in accordance with an embodiment of the invention. Topology 350 corresponds to the second push method 300 of FIG. 3A. As shown in FIG. 3B, the IPG page(s) are transmitted from head-end 102 or local neighborhood equipment 104 downstream within communications network 100. As shown in FIG. 3B, the narrowcast is pushed from head-end 102 or line neighborhood equipment 104 to one or more distribution nodes 106 and finally to the terminals within group of terminals 352.

3. First Pull Method for Demand-Cast

Figure 4A:
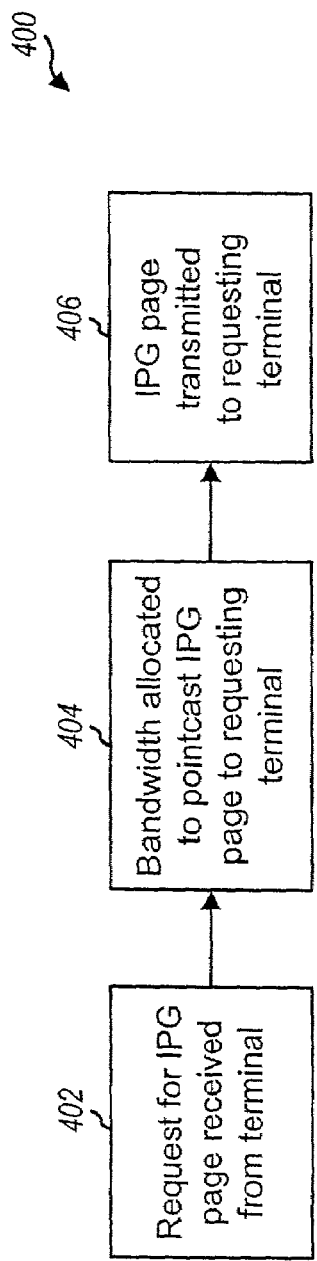
FIGS. 4A and 4B are respectively a flow diagram and a topology for a first pull method for demand-casting IPG pages in accordance with an embodiment of the invention.

FIG. 4A is a flow diagram showing a first pull method 400 for demand-casting IPG pages in accordance with an embodiment of the invention. As described below, method 400 includes three steps.

In a first step 402, a request for an IPG page is received from a terminal 108. The request is transmitted upstream from terminal 108 to head-end 102 or line neighborhood equipment 104 via communications network 100. The upstream transmission may be achieved via an out-of-band network or, alternatively, via an in-band network. Such request from the requesting terminal may comprise, for example, a look-ahead request for programming for a time period ahead of the current time period. For a system where one or more IPG pages are already broadcast as shown in FIGS. 2A and 2B, the requesting terminal may first check to see whether or not the requested IPG page is already being broadcast before transmitting the request upstream.

In a second step 404, the bandwidth to pointcast the requested IPG page is allocated by the distribution system for that purpose. For example, as described in more detail below, the bandwidth manager within head-end 102 and/or local neighborhood equipment 104 may allocate the necessary bandwidth within the in-band network to pointcast the requested IPG page to the requesting terminal. The allocation is performed if sufficient system resources are available to establish a pointcast session. Moreover, if the requested IPG page is already being broadcast as shown in FIGS. 2A and 2B, then no additional bandwidth for a pointcast needs be allocated.

In a third step 406, the requested IPG page is pointcast to the requesting terminal. The pointcast needs only to be received by the requesting terminal and does not need to be received by other terminals. The pointcast is sent downstream from head-end 102 or local neighborhood equipment 104 to the requesting terminal. The pointcast, if necessary, is achieved within the allocated in-band bandwidth. If the requested IPG page is already being broadcast as shown in FIGS. 2A and 2B, then the pointcast needs not be performed.

Figure 4B:
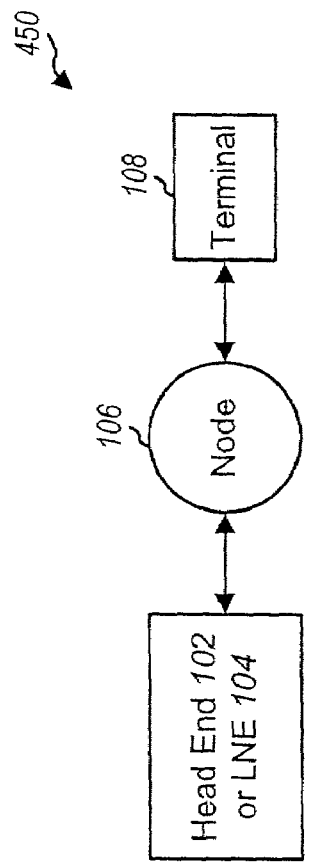

FIG. 4B depicts a first pull topology 450 for demand-casting IPG pages in accordance with an embodiment of the invention. Topology 450 corresponds to first pull method 400 shown in FIG. 4A. As shown in FIG. 4B, the request is transmitted upstream from the requesting terminal to head-end 102 or line neighborhood equipment 104 via communications network 100. Subsequently, the requested IPG page is pointcast downstream from head-end 102 or line neighborhood equipment 104 to the requesting terminal via communications network 100.

4. Second Pull Method for Demand-Cast

FIG. 5A is a flow diagram showing a second pull method 500 for demand-casting IPG pages in accordance with an embodiment of the invention. As described below, method 500 includes three steps.

In a first step 502, a request for an IPG page is received from a requesting terminal 552. The request is transmitted upstream from requesting terminal 552 to head-end 102 or line neighborhood equipment 104 via communications network 100. The upstream transmission may be achieved via an out-of-band network or, alternatively, via an in-band network. Such request may comprise, for example, a look-ahead request for special interest programming available for a future time period ahead of the current time period. For a system where a set or sets of IPG pages are already being broadcast as shown in FIGS. 2A and 2B, requesting terminal 552 may first check to determine whether or not the requested IPG page is already being broadcast before transmitting the request upstream.

In a second step 504, the bandwidth to narrowcast the requested IPG page is allocated by the distribution system for that purpose. For example, as described below in relation to FIGS. 7 and 8, the bandwidth manager within head-end 102 and/or local neighborhood equipment 104 may allocate the necessary bandwidth within the in-band network to narrowcast the requested IPG page to a group of terminals 554 that includes requesting terminal 552. The allocation is performed if sufficient system resources are available to establish a narrowcast session. If the requested IPG page is already being broadcast as shown in FIGS. 2A and 2B, then no additional bandwidth for a pointcast needs be allocated. The group of terminals 554 may include terminals in one geographic area or terminals dispersed among different geographic areas but linked, for example, via a network group address.

In a third step 506, the requested IPG page is narrowcast to group of terminals 554. The narrowcast needs only to be received by the terminals within group of terminals 554 and does not need to be received by other terminals. The narrowcast is sent downstream from head-end 102 or local neighborhood equipment 104 to group of terminals 554. The narrowcast is achieved within the allocated in-band bandwidth. If the requested IPG page is already being broadcast as shown in FIGS. 2A and 2B, then the narrowcast needs not be performed.

FIG. 5B depicts a second pull topology 550 for demand-casting IPG pages in accordance with an embodiment of the invention. Topology 550 corresponds to second pull method 500 shown in FIG. 5A. As shown in FIG. 5B, the request is transmitted upstream from requesting terminal 552 to head-end 102 or line neighborhood equipment 104 via communications network 100. Subsequently, the requested IPG page is narrowcast downstream from head-end 102 or line neighborhood equipment 104 to group of terminals 554, which includes requesting terminal 552, via communications network 100.

5. Third Pull Method for Demand-Cast

Figure 6A:
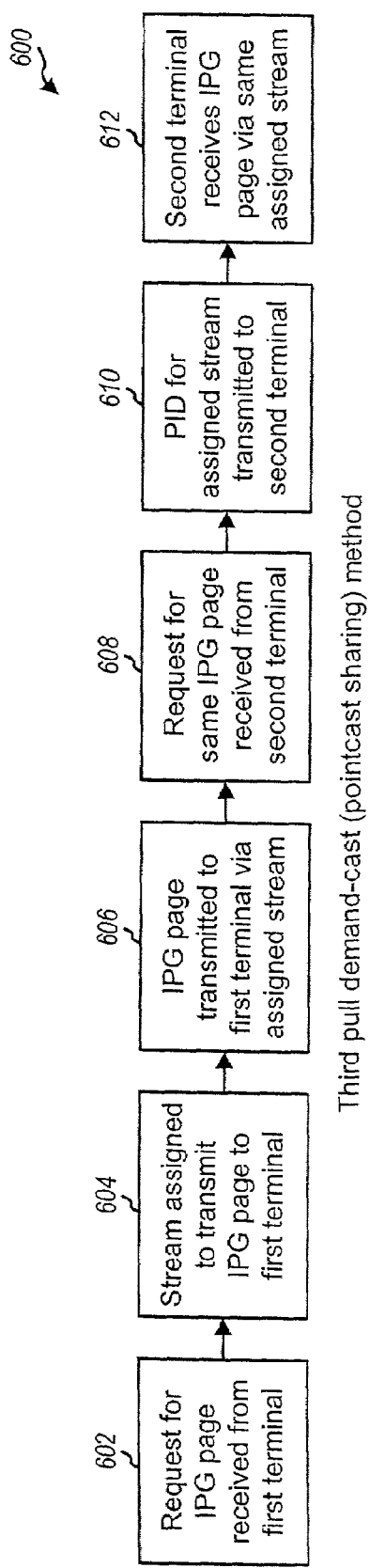
FIGS. 6A and 6B are respectively a flow diagram and a topology for a third pull method for demand-casting of IPG pages in accordance with an embodiment of the invention.

FIG. 6A is a flow diagram showing a third pull method 600 for demand-casting IPG pages in accordance with an embodiment of the invention. As described below, method 600 includes five steps.

In a first step 602, a request for an IPG page is received from a first terminal 652. The request is transmitted upstream from first terminal 652 to head-end 102 or line neighborhood equipment 104 via communications network 100. The upstream transmission may be achieved via an out-of-band network or, alternatively, via an in-band network. Such request from first terminal 652 may comprise, for example, a look-ahead request for programming for a future time period ahead of the current time period. For a system where one or more IPG pages are already being broadcast as shown in FIGS. 2A and 2B, first terminal 652 may first check to see whether or not the requested IPG page is already being broadcast before transmitting the request upstream.

In a second step 604, a stream 656 may be assigned by the distribution system to pointcast the requested IPG page. The assignment is performed if sufficient system resources are available to establish a pointcast session. For example, as described below in more detail, the bandwidth manager within head-end 102 and/or local neighborhood equipment 104 may determine that sufficient resources are available to assign stream 656 to pointcast the requested IPG page to first terminal 652. The stream assignment may be achieved, for example, by assigning a particular value to the program identifier (PID) for stream 656. If the requested IPG page is already being broadcast as shown in FIGS. 2A and 2B, then stream 656 needs not be assigned.

In a third step 606, the requested IPG page is pointcast to first terminal 652 via assigned stream 656. This may be achieved by transmitting packets that are identified by the particular PID value and contain a video sequence of the requested IPG page. The pointcast needs only to be received by first terminal 652 and does not need to be received by other terminals. The pointcast is sent downstream from head-end 102 or local neighborhood equipment 104 to first terminal 652. If the requested IPG page is already being broadcast as shown in FIGS. 2A and 2B, then the pointcast needs not be performed.

In a fourth step 608, a request for an IPG page is received from a second terminal 654. In this example, the IPG page requested by second terminal 654 is the same as the IPG page requested by first terminal 652. Similar the first request, the second request is transmitted upstream from second terminal 654 to head-end 102 or line neighborhood equipment 104 via communications network 100 via an out-of-band network or an in-band network. Second terminal 654 may be in the same or different geographic area as first terminal 652.

In a fifth step 610, the identifier (e.g., PID value) for the assigned stream 656 is transmitted from head-end 102 or line neighborhood equipment 104 to second terminal 654. This enables the next step 612 to occur without use of additional PIDs or additional network bandwidth.

And in a sixth step 612, second terminal 654 receives the requested IPG page via the same assigned stream 656, which was used to deliver the IPG page to first terminal 652. Second terminal 654 may be set to decode and present packets that are identified by the particular PID value for stream 656. Such packets contain the video sequence of the requested IPG page. In this manner, "sharing" of stream 656 occurs, changing the previous "single" pointcast to a "double" pointcast.

Similarly, other terminals may "share" the pointcast if they request the same IPG page and can receive the requested IPG page via the same stream 656. In this manner, any number of terminals may share the pointcast. This sharing results in more efficient use of the available bandwidth.

Figure 6B:
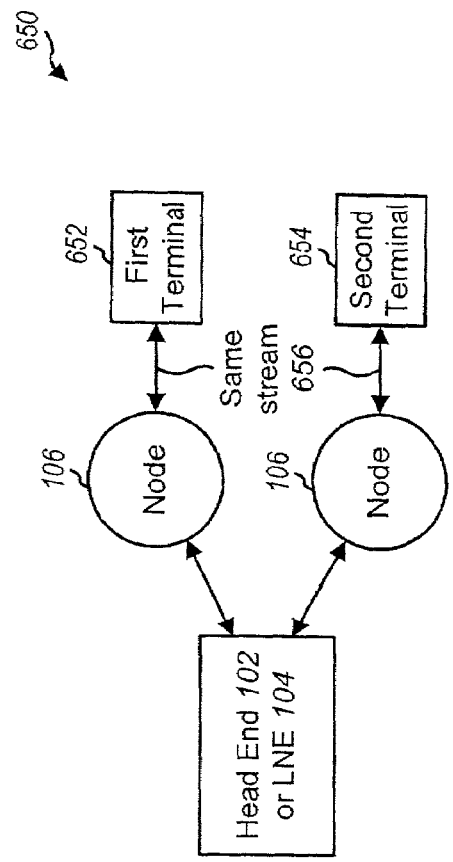

FIG. 6B depicts a third pull topology 650 for demand-casting IPG pages in accordance with an embodiment of the invention. Topology 650 corresponds to pointcast "sharing" method 600 shown in FIG. 6A. As shown in FIG. 6B, a request is transmitted upstream from first terminal 652 to head-end 102 or line neighborhood equipment 104 via communications network 100. In response, the requested IPG page is pointcast by stream 656 from head-end 102 or line neighborhood equipment 104 to first terminal 652. Next, a second request for the same IPG page is transmitted upstream from second terminal 654 to head-end 102 or line neighborhood equipment 104 via communications network 100. In response, the identifier for stream 656 is transmitted from head-end 102 or line neighborhood equipment 104 to second terminal 654. Subsequently, second terminal 654 uses the identifier to receive the IPG page from the same stream 656.

Figure 6C:
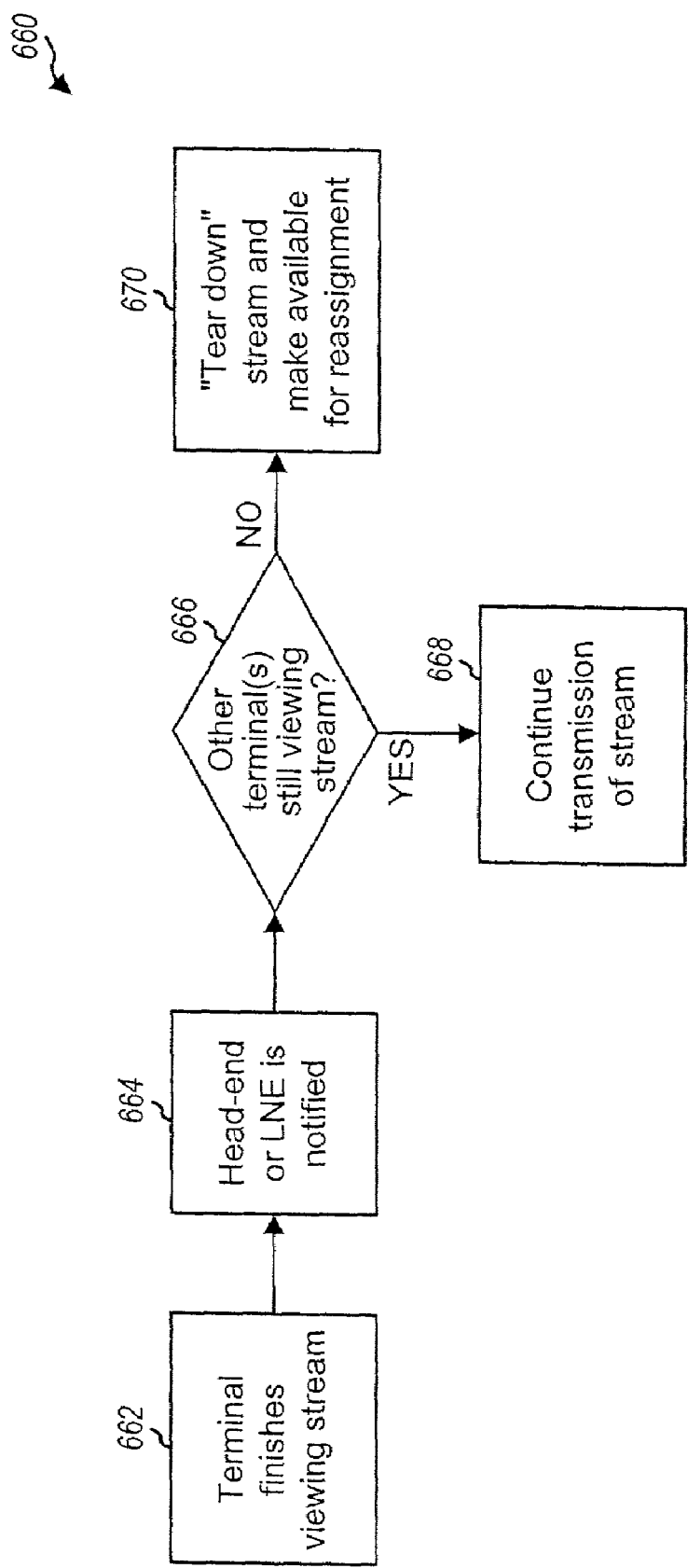
FIG. 6C is a flow diagram showing a method of terminating (or continuing) demand-casts in accordance with the third pull method.

FIG. 6C is a flow diagram showing a method 660 of terminating (or continuing) demand-casts in accordance with third pull method 600. As described below, method 660 includes five steps.

In a first step 662, a terminal finishes viewing a stream used to send an IPG page. In the example described above in FIGS. 6A and 6B, the terminal may be either first terminal 652 or second terminal 654. In general, the terminal may be any of the terminals that are sharing the same stream, or the last terminal to view a stream that was previously shared.

In a second step 664, head-end 102 or line neighborhood equipment 104 is notified that the terminal has finished viewing the stream. Such notification can be achieved by the terminal by sending a communication upstream to head-end 102 or line neighborhood equipment 104 via an out-of-band or in-band network.

In a third step 666, a determination is made whether or not that stream is being viewed by one or more terminals. As described in more detail below, this determination is done within head-end 102 or line neighborhood equipment 104 and may be done by a bandwidth manager in conjunction with a session manager.

In a fourth step 668, if one or more terminals are still viewing that stream, then head-end 102 or line neighborhood equipment 104 continues to transmit the stream. Such transmission is typically performed by an in-band delivery system.

Finally, in a fifth step 670, if no other terminals are viewing that stream, then the stream is "torn down" so that it is no longer transmitted and no longer takes up network bandwidth. The torn down stream is then available for reassignment and the bandwidth can be reused to transmit a different pointcast, narrowcast, or broadcast.

C. Demand-Cast System

1. Guide Page Usage Frequency Distribution

The usage of guide pages can be characterized by their frequency distribution. Certain pages in a guide page matrix, such as those in the current time slot and adjacent time slots ("near look-ahead") are likely to be accessed more frequently by viewers. Other guide pages, such as the "far look-ahead" pages, are likely to be accessed less frequently. These characteristics of guide page usage can be supported by a demand-cast model described herein. Access to all possible guide pages in the guide page matrix can be achieved by sending in a transport stream a combination of continually broadcast guide pages for pages that are more frequently accessed, and temporarily broadcast or demand-cast guide pages for pages less frequently accessed. In an embodiment, current and near look-ahead pages are sent in a broadcast fashion and far look-ahead pages are sent in a demand-cast fashion.

2. Demand-Cast Overview

A demand-cast IPG system is a two-way system employing communication between the terminal in the communications network and the head-end via a back-channel. Demand-cast pages are inserted in the transport stream for temporary broadcast in response to access demand generated by viewers in the network. When a particular viewer request a particular guide page, one of two things can occur. If the requested page is already in the IPG broadcast, the terminal simply acquires the corresponding stream. Otherwise, if the page is not in the broadcast, the terminal requests the head-end to insert a stream in the IPG multiplex for the requested page. The head-end can then replace the least frequently accessed and not currently accessed stream in the IPG multiplex with a stream for the newly requested page.

When a terminal no longer accesses a guide page, it informs the head-end that it has released it. When accessing a demand-cast page, an IPG application at the terminal can time-out following a certain particular period of inactivity (e.g., 2 minutes) by the viewer. If a time-out occurs, the terminal can inform the head-end that it has released the page. Informing the head-end when demand-cast pages are released ensures that non-accessed demand-cast pages are available for substitution. If a terminal requests a new demand-cast page to be inserted into the IPG multiplex and there is no slot available in the IPG multiplex, the head-end refuse to insert a stream for the newly requested guide page, which then results in a blockage. Most statistical multiplexed systems are susceptible to blockage if loaded with an excessive number of users and during chaotic episodes. An advantage of the demand-cast model is that if a particular page is likely to be extensively accessed, such as a page listing a major sports event, the page only needs to be inserted once into the transport stream. The page is then readily accessible by any number of terminals without consuming additional bandwidth.

3. Latency in Broadcast Vs. Demand-Cast

Access to guide pages within a short delay (i.e., with low latency) is an important feature for interactive program guide. Continually broadcast pages offer a low latency access, whereas demand-cast pages may incur additional processing delays if not yet included in the transport stream. In an embodiment, frequently accessed pages, such as those in the current time slot and near look-ahead time slots, and perhaps prime-time slots are broadcast continually so that they can be accessed with the lowest possible latency. Less frequently accessed far look-ahead pages can be sent via demand-cast.

4. System Description

Figure 7:
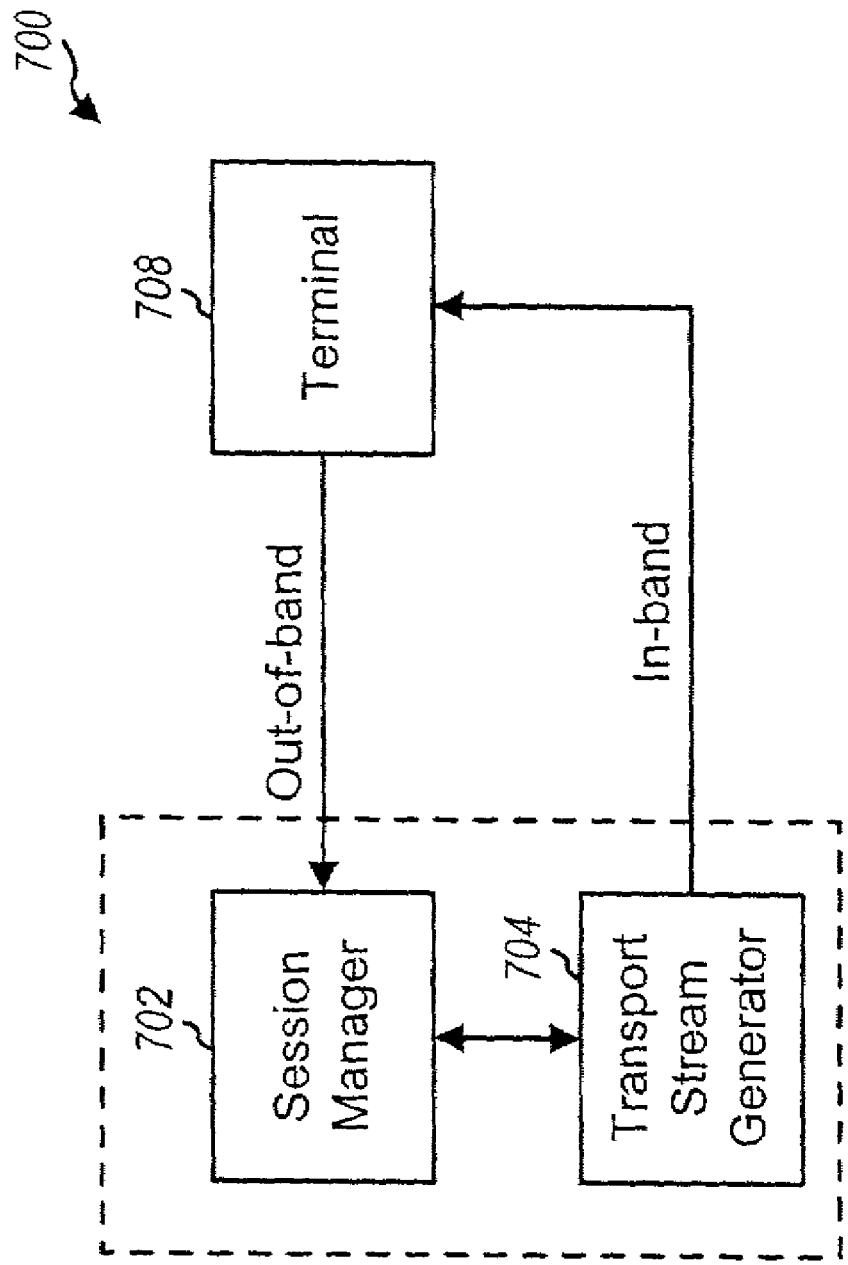
FIG. 7 is a diagram of a two-way system for efficient delivery of demand-cast video sequences in accordance with an embodiment of the invention.

FIG. 7 is a diagram of a two-way system 700 that can efficiently deliver demand-cast video sequences in accordance with an embodiment of the invention. System 700 includes a session manager (SM) 702 and a transport stream generator (TSG) 704.

Session manager 702 and transport stream generator 704 may be co-located within a distribution center. The distribution center may comprise, for example, head-end 102 in communications network 100. Alternatively, session manager 702 and transport stream generator 704 may be at different locations. For example, session manager 702 may be located at head-end 102, and transport stream generator 704 may be located at local neighborhood equipment 104 in communications system 100.

Session manager 702 and transport stream generator 704 are both coupled to a number of terminals 708 via a distribution network. The distribution network may comprise, for example, a cable distribution network as illustrated in FIG. 1. In that example, terminals 708 would comprise terminals 108 or an equivalent functionality integrated into a computer system or advanced television. Alternatively, for example, the distribution network may comprise a satellite communications system or another type of communications system (telephonic, wireless, etc.).

Figure 10:
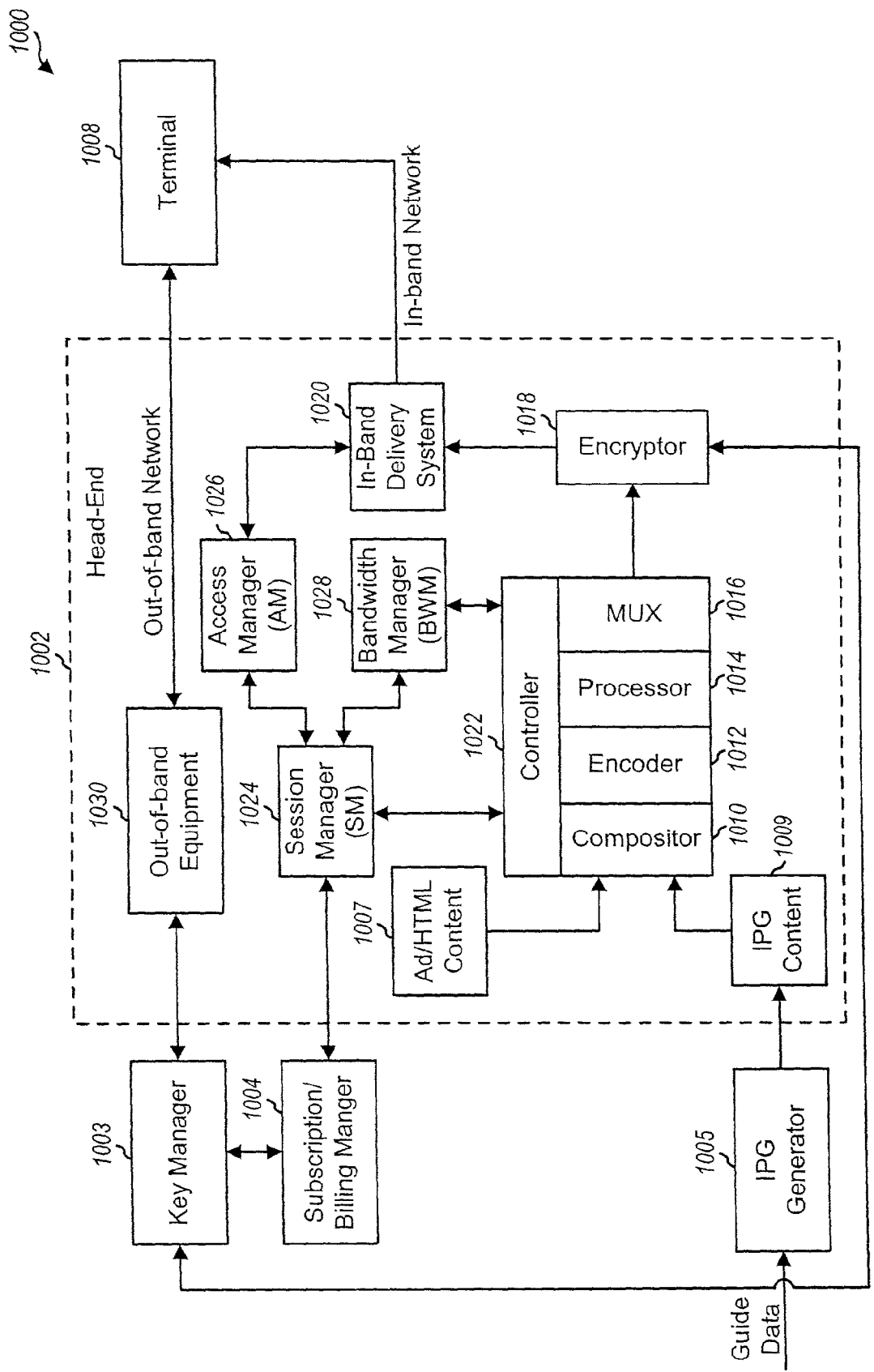
FIGS. 10-13 are block diagrams of first, second, third, and fourth architectures, respectively, for managing delivery of video sequences of an interactive program guide in accordance with embodiments of the invention.

One terminal 708 and its links to session manager 702 and transport stream generator 704 are illustrated in FIG. 10. In the specific embodiment shown in FIG. 10, terminal 708 receives in-band communication from transport stream generator 704 and sends out-of-band (OOB) communications to session manager 702. In an alternative embodiment, the communication to session manager 702 may comprise upstream in-band communications.

Session manager 702 may comprise, in one embodiment, a computer system residing at head-end 102. The computer system may comprise, for example, a computer server running a particular operating system (e.g., a version of the UNIX or Windows operating system). The computer system may receive out-of-band communication from terminals 708 via a connection to the network controller. For example, the connection may comprise an Ethernet connection, and the network controller may comprise a controller from General Instruments Corp (now part of Motorola Inc.) or another supplier. The computer system also communicates with and controls transport stream generator 704 via a network connection such as an Ethernet connection.

Session manager 702 manages delivery of IPG pages to terminals 708 on a number of cable nodes, with each node being served by a separate IPG multiplexed transport stream generated at a corresponding transport stream generator 704. Session manager 702 also monitors demand-cast stream usage by terminals 708. Session manager 702 tracks IPG demand-cast streams that are acquired by at least one terminal 708. For example, session manager 702 can maintain a table that dynamically lists which terminals 708 are using each stream. This tracking is performed for each IPG multiplexed transport stream managed by session manager 702.

Session manager 702 also accepts messages from terminals 708 indicating that they have acquired, released, or requested demand-cast streams. A new terminal 708 that has acquired a demand-cast stream is registered (i.e., added) to the stream, and a terminal 708 that has released a demand-cast stream is removed from the registry for the stream. Session manager 702 informs the corresponding transport stream generator 704 if there is no longer any terminals 708 registered to a particular demand-cast stream, and also informs transport stream generator 704 when a terminal 708 requests a demand-cast stream. In one embodiment, session manager 702 may time-out acquisition of a stream by any terminal 708 if the terminal has not released the stream within a particular period of time (e.g., a few minutes). The time-out may be implemented by removing terminals 708 from the registry for the stream after the particular period of time.

Transport stream generator 704 may comprise, in one embodiment, a computer system residing at head-end 102. The computer system may comprise, for example, a computer server running a particular operating system (e.g., a version of Windows or UNIX operating system). Alternatively, transport stream generator 704 may be located apart from session manager 702, for example, at local neighborhood equipment 104. Each transport stream generator 704 is coupled to an associated session manager 702, for example, via an Ethernet network. Transport stream generator 704 may generate one or more IPG multiplexed transport stream, with each transport stream being broadcast to a respective node in the distribution system.

In one embodiment, the IPG multiplexed transport stream comprises an MPEG transport stream. In this case, transport stream generator 704 may communicate with terminals 708 via tables in the private section of the MPEG transport stream. Such table may include a list of available demand-cast streams, along with the address of the source transport stream generator 704 and information to identify the particular IPG multiplexed transport stream to which the table belongs.

Transport stream generator 704 manages each IPG multiplexed transport stream that it generates. Transport stream generator 704 receives information from session manager 702 indicating whether each demand-cast stream being served is currently being acquired by any terminal, or not at all. That is, transport stream generator 704 is informed by session manager 702 when a demand-cast stream is no longer being acquired any terminals 708.

In one embodiment, transport stream generator 704 maintains a status for each demand-cast stream being served. The status for each stream is adjusted upon receipt by transport stream generator 704 of certain messages from session manager 702. In an embodiment, the basic states for the stream status comprise an "acquired" state that denotes that the demand-cast stream is being acquired by one or more terminals 708, and a "released" state that denotes that the demand-cast stream is not being acquired by any terminal 708. Transport stream generator 704 continues to serve "acquired" demand-cast streams by multiplexing them into the appropriate transport streams and replaces "released" demand-cast streams with new demand-cast streams upon receipt of request messages from session manager 702. In an embodiment, transport stream generator 704 also keeps track of the order in which the streams are released, so that the oldest released stream may be used as the most likely candidate for replacement.

If all demand-cast streams in a particular IPG multiplexed transport stream are "acquired," then a new stream may not be inserted into the transport stream, and transport stream generator 704 may refuse any new requests. In such case, a message indicating such refusal may be sent to session manager 702 and/or the requesting terminal 708.

In an embodiment, terminal 708 comprises a set-top terminal (STT) for use by a service subscriber. The STT may comprise an embedded system that includes a tuner, a demultiplexer, and a decoder, as described in further detail below. The STT drives the subscriber's display unit or TV set, and it may be coupled to transport stream generator 704 via an RF feed from a cable distribution network. The IPG pages may be received from a particular IPG multiplexed transport stream on a particular modulated carrier signal. In an embodiment, the IPG multiplexed transport stream may comprise an ensemble of elementary MPEG video streams, with each elementary stream representing a portion of the guide.

In an embodiment, terminal 708 includes IPG client software application that resides at the terminal. The IPG client application is responsible for presenting the IPG to the viewer, and demultiplexes and decodes IPG pages requested by the user. If a requested page is already being received via the IPG multiplexed transport stream, then the IPG client application acquires the stream immediately and sends a message to session manager 702 indicating that it has acquired the stream. And if the requested page is not in the IPG multiplexed transport stream, then the IPG client application sends a request message to session manager 702. Subsequently, the IPG client application acquires the stream once it is transmitted by transport stream generator 704 and received by terminal 708. In addition, if a stream is no longer being acquired, the IPG client application sends a release message to session manager 702. In an embodiment, if there is no remote control or other activity by the user for a particular period of time (e.g., a few minutes), then the IPG client application times-out the acquisition. The time-out may be accomplished, for example, by sending a release message to session manager 702 and acquiring a broadcast stream instead.

D. Major Modules of Demand-Cast System

The demand-cast system includes three major subsystems: the set top terminal (STT), the session manager (SM), and the transport stream generator (TSG). For a better understanding of the invention, a specific implementation of each subsystem is now described. Other implementations are also possible and within the scope of the invention.

1. Set-Top Terminal (STT)

The STT is the end-user or cable service subscriber tuner/demultiplexer/decoder and embedded system. In an embodiment, the STT used in initial pilot deployments of the demand-cast system is the General Instruments DCT-2000. The STT is coupled to the cable operator RF feed and drives the subscribers display unit or TV set. The IPG content is provided in an IPG transport stream (i.e., IPG multiplex) located on a specific QAM carrier. The IPG multiplex contains an ensemble of elementary MPEG video streams, with each elementary video stream representing portions of the guide and some of these streams representing guide grid pages. The STT receives messages from the head-end via tables in the private section of the IPG transport stream (in-band messaging.) The STT sends messages to the head-end via an out-of-band back-channel or return path.

The STT includes an IPG application that is responsible for presenting (e.g., the DIVA Interactive Program Guide) to the viewer. The IPG application demultiplexes and decodes IPG pages requested by the user. If a particular page is in the IPG transport stream, the STT can quickly acquire the stream inform the session manager that it has requested the page. And if the page is not in the IPG multiplex, the STT also sends a message to the session manager that it has requested it. The STT then acquires the stream once the stream is included in the IPG multiplex. When the STT no longer acquires a particular guide stream, it informs the session manager that it has released the stream.

In an embodiment, if the STT is on a particular demand-cast stream for more than a particular period of time (e.g., 2 minutes) without any remote control activity, the STT times-out. The STT then acquires a broadcast stream instead and informs the session manager that it has released the demand-cast stream.

2. Session Manager (SM)

In an embodiment, the session manager is implemented with a computer system (e.g., a SPARC Station running the Solaris operating system from SunMicrosystems, Inc.) residing at the cable head-end. The session manager is coupled via Ethernet to the server side of a network controller (NC) from General Instruments Corp. and is the receiver for out-of-band return path messages originating from the STTs. The session manager can handle STTs on multiple cable nodes, each node being served by a separate IPG multiplex. The session manager communicates with and controls the transport stream generators via Ethernet. The transport stream generators generate the IPG transport streams.

The session manager manages one or more cable networks and monitors demand-cast stream usage. The session manager also tracks IPG demand-cast streams that are acquired by at least one STT and maintains a dynamic list of STTs that are using each demand-cast stream. This tracking is achieved for each IPG multiplex managed by the session manager. The session manager accepts messages from the STTs indicating requests for, or release of, demand-cast streams. An STT that has acquired a demand-cast stream is registered to the stream, and an STT that has released a demand-cast stream is removed from the stream's registry. The session manager informs the transport stream generator if there are no longer any STTs using a particular demand-cast stream, and also informs the transport stream generator when an STT requests a demand-cast stream.

In an embodiment, the session manager times-out an STT from a demand-cast stream if the STT has not released the stream within a particular time period (e.g., a few minutes). The session manager can achieve this by removing the STT from the demand-cast stream's registry.

3. Transport Stream Generator (TSG)

In an embodiment, the transport stream generator is implemented with a computer system (e.g., running a WindowNT operating system from Microsoft Corp.) residing at the cable head-end. The transport stream generator is coupled via Ethernet to the session manager controlling it. The transport stream generator produces one or more IPG transport streams, with each transport stream being broadcast to a respective node. In an embodiment, the transport stream generator communicates with the STTs via tables in the private section of the IPG transport streams. The table contains a list of the available demand-cast streams along with the IP address of the source transport stream generator (e.g., its IP address) and the channel number of the IPG multiplex (i.e., which multiplex it is in the transport stream generator).

The transport stream generator manages the transport stream for each IPG multiplex it generates. The transport stream generator receives information from the session manager for each demand-cast stream indicating whether the stream is currently acquired by any STT or released by all STTs. The transport stream generator is informed by the session manager when there is no longer any STT on a particular demand-cast stream and when an STT requests a demand-cast stream.

The transport stream generator maintains status for all demand-cast streams in each IPG multiplex. The transport stream generator adjusts the status for each demand-cast stream each time it receives a message from the session manager for the stream. The basic status for each stream includes "acquired" for a stream that is in use by one or more STTs and "released" for a stream that is not in use by any STT. The transport stream generator continues to send "acquired" streams in its IPG multiplexes and replaces "released" streams with new demand-cast streams as they are requested. The transport stream generator also keeps track of the age of the released streams and the best candidate for replacement is the oldest released stream. If all demand-cast streams in a multiplex are "acquired" then it may not be possible to insert a new stream when requested and the transport stream generator can refuse to process the request.

E. Example of Interactive Program Guide

An embodiment of an interactive program guide in accordance with the invention is described below. The embodiment is described for purposes of illustration and is not meant to limit the scope of the invention.

Figure 8:
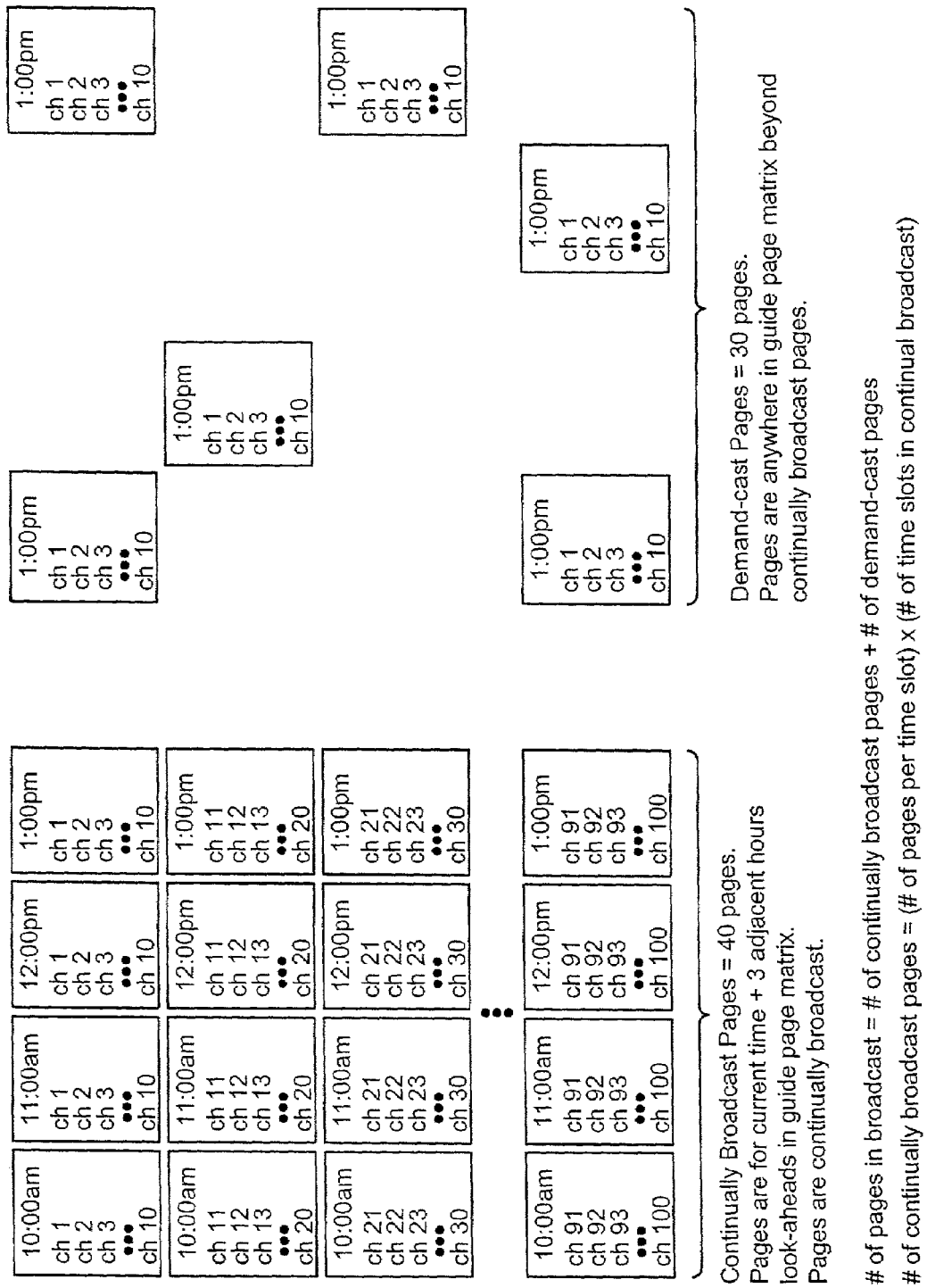
FIG. 8 depicts an example of a set of IPG pages for continual broadcast and other IPG pages for demand-cast in accordance with an embodiment of the invention.

FIG. 8 depicts an example of a set of IPG pages for continual broadcast and other IPG pages for variable demand-cast in accordance with an embodiment of the invention. In the specific example shown in FIG. 8, 40 IPG pages are continually broadcast and up to 30 IPG pages may be variably demand-cast. There are 10 guide pages per time slot, and the continual broadcast includes 10 guide pages for the current time slot and 30 guide pages for the next three 1-hour time slots. The variably demand-cast pages may be any pages within the guide page matrix that are not currently being broadcast.

In such a system, when a request for a guide page is made by a particular terminal, either one of two scenarios can occur. First, if the page is already in the IPG broadcast, then the terminal simply acquires the stream for the page from the IPG broadcast. Alternatively, if the page is not in the broadcast, then the terminal transmits a request for the page to the head-end. The head-end may then fulfill the request by replacing the currently transmitted stream that is least frequently accessed and not currently accessed with another stream containing the requested page.

Subsequently, the terminal eventually ends its access of the guide page. This may occur because the user has instructed the terminal to view a different page. Alternatively, this may occur because of a time-out due to inactivity over a particular period of time (e.g., 2 minutes). In any case, if the terminal is no longer accessing the guide page, then the terminal transmits a message to the head-end indicating that it has released the corresponding stream. Informing the head-end when demand-cast pages become released ensures that non-accessed demand-cast pages become available for substitution, as described above.

An advantage of the invention is that, if a particular page is extensively accessed (such as a page listing a major sports event), then the system needs to insert the particular page only once into the transport stream. Once inserted, the page is readily accessible by any number of terminals without requiring additional bandwidth. Other systems may be more susceptible to blockage, which occurs, for example, when a newly requested page cannot be inserted into the transport stream because no bandwidth is available within the transport stream.

An IPG delivery system in accordance with an embodiment of the invention is a two-way system that is capable of supporting two-way communication between the terminals on the cable network and the equipment in the cable head-end. For example, communication may be transmitted from the terminals to the head-end via a back-channel, and content may be transmitted from the head-end to the terminals by insertion into a transport stream.

Figure 9:
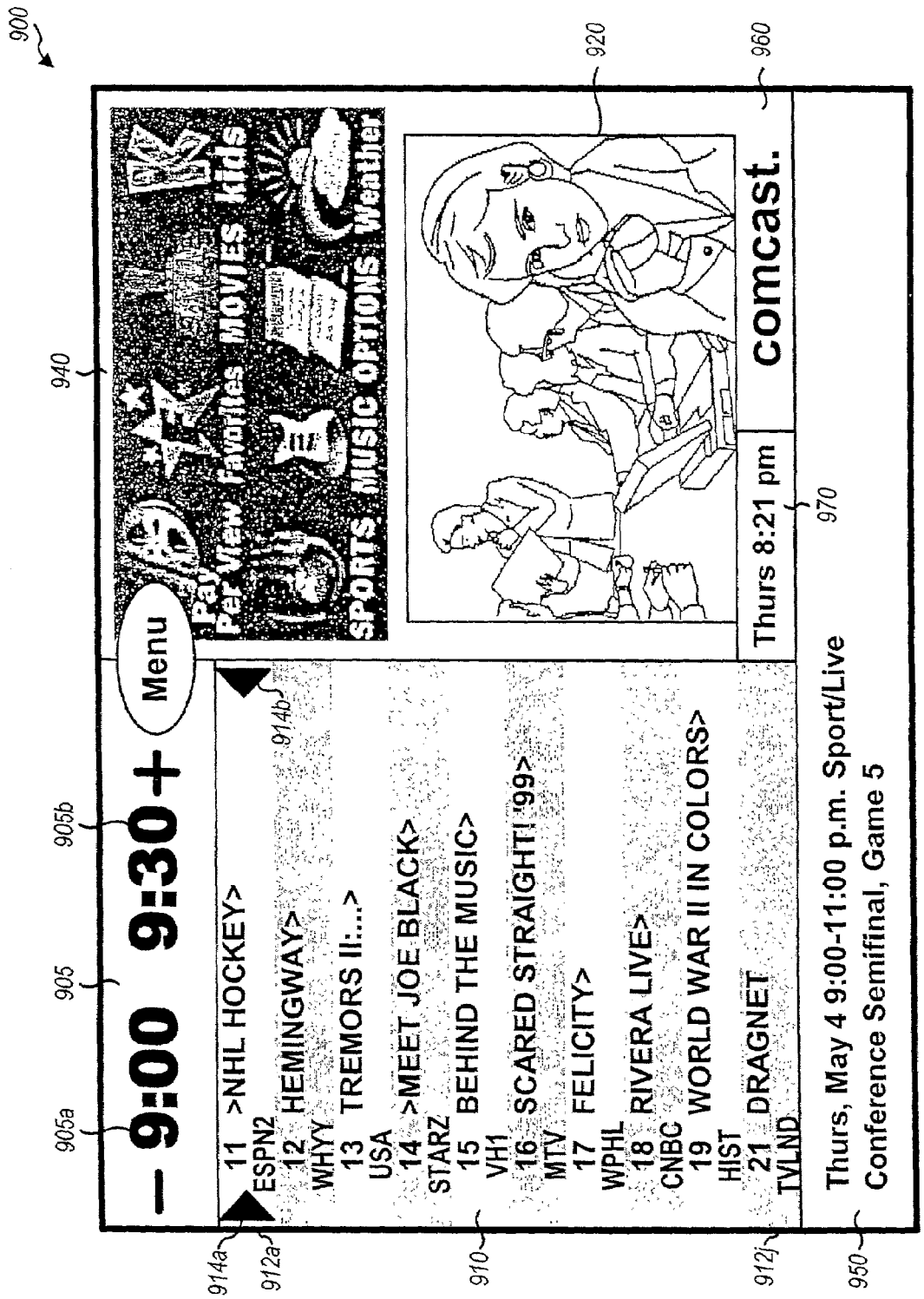
FIG. 9 is an example of one picture taken from a video sequence that can be encoded using the invention.

FIG. 9 depicts an example of an IPG page 900 in accordance with an embodiment of the invention. In the specific embodiment shown in FIG. 9, IPG page 900 includes a time slot region 905, a guide region 910, a video region 920, an icon region 940, a program description region 950, a logo region 960, and a date/time display 970. Other designs for the IPG page with different layouts, configurations, and combinations of regions and objects can be contemplated and are within the scope of the invention.

Time slot region 905 includes a first time slot object 905a and a second time slot object 905b that indicate the time slots for which program guide is being provided on the IPG page. Guide region 910 is used to display program listings for a group of channels. In the embodiment shown in FIG. 9, the program listings show the available programming in two half-hour time slots. Guide region 910 thus includes a number of channel objects 912a through 912j used to display channel information for a guide listing of channels. Guide region 910 further includes a pair of channel indicator icons 914a and 914b that identifies the current cursor location.

Program description region 950 is used to present descriptive information relating to a particular program selected from the program listings, or may be used to show other information. Video region 920 may be used to display images, videos, text, or a combination thereof, which may be used for advertisements, previews, or other purposes. Video region 920 may be implemented as described above in a server-centric manner. Logo region 960 may include a logo of a service operator or other entity and may be optionally displayed. Date/time display 970 may be configurable by the user and may also be optionally displayed.

Icon region 940 is used to display various icons, which may be created and/or enabled by the user. Each icon in icon region 940 can represent a filter or a link to another IPG page or a particular interface. Each filter selects a particular type of programming to be included in the program listings shown in guide region 902. For example, a Pay Per View (PPV) icon 941 may be a filter that selects only PPV programming to be included in the program listings. A Favorites icon 942 may be a filter that selects only channels designated by the user to be among his or her favorites. A Movies icon 943 may be a filter that selects only movies or movie channels. A Kids icon 944 may be a filter that selects only channels for children or programming appropriate for or produced for viewing by children. A Sports icon 945 may be a filter that selects only sports channels or sports-related programming. A Music icon 946 is a link to a music interface. An Options icon 947 may also be a link to a menu of IPG options that the user may select amongst. The options may include (1) configuration and selection/deselection information of IPG related services, (2) custom information such as deactivating some of the filters or accessing the custom condensed listing menus, and others. A Weather icon 948 may be a link to an interface to weather information.

In a system, illustratively, comprising 80 channels of information, the channels are displayed in 10-channel groups having associated with them two half-hour time slots. In this organization, 8 video PIDs are provided to carry the present-time channel/time/title information, one or more audio PID is provided to carry the audio barker and/or one or more data PIDs (or other data transport method) are provided to carry the program description data, overlay data, and the like. To fully broadcast interactive program information for up to 24 hours in advance, 192 (e.g., 8*24) video PIDs are provided, along with one or more audio PIDs and, optionally, one or more data PIDs.

The time depth of a program guide is defined by the amount of time in programming is provided in the broadcast video PIDs for the particular channel groups. The channel depth of the program guide is defined by the number of channels available through the guide (as compared to the total number of channels in the system). In a system providing only half of the available channels via the broadcast video PIDs, the channel depth 50%. In a system providing 12 hours of "look-ahead" time slot, the time depth is 12 hours. In a system providing 16 hours of time slot "look-ahead" and 4 hours of "look-back" time slot, the time depth is +16/−4 hours.

The video streams representing the IPG are sent in a one or more transport streams, within the form of a single or multi-programs as described above. A user desiring to view the next 1-hour time interval (e.g., 10:00-11:00) may activate a "scroll right" object (or move the joystick to the right when a program within guide region 910 occupies the final displayed time interval). Such activation results in a controller within the terminal noting that a new time interval is desired. The video stream desired to the new time interval is then decoded and displayed. If the corresponding video stream is within the same transport stream (i.e., a new PID), then the stream is simply decoded and presented. If the desired video stream is within a different transport stream, then that transport stream is extracted from the broadcast stream and the desired video stream is decoded and presented. And if the desired transport stream is within a different broadcast stream, then that broadcast stream is tuned, the desired transport stream is extracted, and the desired video stream is decoded and presented.

A user interaction requesting in a prior time interval or a different set of channels results in the retrieval and presentation of the desired video stream. If the desired video stream is not part of the broadcast video streams, then a pointcast session, for example, may be initiated as described above for FIGS. 4A and 4B. For this pointcast session, the terminal sends a message to the head-end via a back channel requesting a particular stream. The head-end processes the request, retrieves the desired stream from the information server, and incorporates the stream within a transport stream as a video PID. Preferably, the desired stream is inserted into the transport stream currently being tuned/selected by the terminal. The head-end further informs the terminal which PID should be received and from which transport stream it should be demultiplexed. The terminal then retrieves the desired video PID. If the video PID is within a different transport stream, the terminal first demultiplexes that transport stream (possibly by tuning a different QAM stream within the forward channel).

Typically, upon completion of the viewing of the desired stream, the terminal indicates to the head-end that it no longer needs the stream. In response, the head-end tears down the pointcast session. The terminal then returns to the broadcast stream from which the pointcast session was launched. However, as described above in FIGS. 6A, 6B, and 6C, the method for "sharing" pointcasts may delay or avoid the need to tear down the pointcast session if another terminal is still utilizing the pointcast. In addition, the above described pointcast sharing technique more efficiently utilizes the network bandwidth allocated for pointcasts.

Push demand-casts and pull demand-casts are associated with different delays (i.e., latencies). Access to IPG pages with low latency is a desirable feature in interactive program guide. A system that only pushes IPG pages may be able to offer access with the lowest possible latency, whereas a system that only pulls pages may incur significant processing delays in accessing each page.

In accordance with an embodiment of the invention, more frequently accessed IPG pages such as those in the current time slot and near look-ahead time slots, and perhaps prime-time slots are push demand-cast continually so that access can be achieved with low latency. Less frequently accessed (e.g., far look-ahead) pages are pull demand-cast.

F. Example Implementational Architectures

Four architectures are described below for delivery of interactive program guide. These architectures are illustrative of the architectures that may be used to implement various aspects of the invention. However, other architectures may also be used and are within the scope of the invention.

FIG. 10 is a diagram of a first architecture 1000 for managing delivery of video sequences of an interactive program guide in accordance with an embodiment of the invention. First architecture 1000 includes a key manager 1003, a subscription/billing manager 1004, an IPG generator 1006, and a head-end 1002. First architecture 1000 is capable of providing encryption for the IPG content.

Head-end 1002 couples to a number of terminals 1008 via an in-band network and/or an out-of-band (OOB) network.

Head-end 1002 includes various elements that couple together and interact with each other to provide the desired functionality. In the embodiment shown in FIG. 10, head-end 1002 includes an advertising/HTML content source 1007, an IPG content source 1009, a compositor 1010, an encoder 1012, a processor 1014, a multiplexer 1016, an encryptor 1018, an in-band delivery system 1020, a controller 1022, a session manager 1024, an access manager 1026, a bandwidth manager 1028, and an out-of-band (OOB) equipment 1030.

It is noted that session manager 702 in FIG. 7 encompasses the functionality of a number of elements in FIG. 10, including session manager 1024 and bandwidth manager 1028. Also, it is noted that transport stream generator 704 in FIG. 7 also encompasses the functionality of a number of elements in FIG. 10, including processor 1014 and multiplexer 1016.

Figure 11:
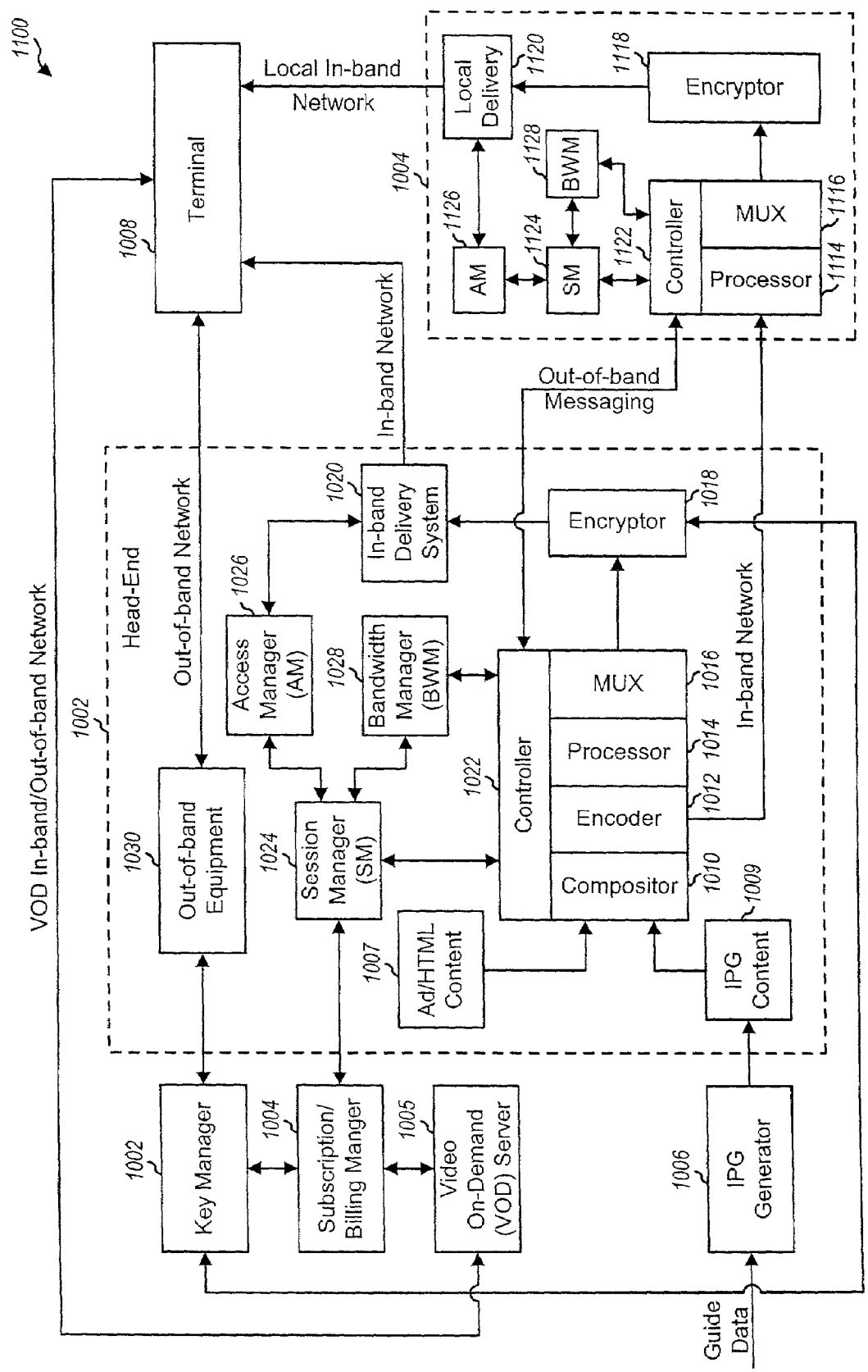

FIG. 11 is a diagram of a second architecture 1100 for managing delivery of video sequences of an interactive program guide in accordance with an embodiment of the invention. Second architecture 1100 includes the elements in first architecture 1000. In addition, second architecture 1100 includes local neighborhood equipment 104 and a video-on-demand (VOD) server 1005. Second architecture 1100 is also capable of providing encryption for the IPG content.

As shown in FIG. 11, line neighborhood equipment 1004 couples to head-end 1002 via an in-band network and an out-of-band messaging system. Line neighborhood equipment 1004 also couples to a number of terminals 1008 via a local in-band network. Line neighborhood equipment 1004 includes various elements that couple together and interact with each other to provide the desired functionality. Line neighborhood equipment 1004 typically includes a subset of the type of components in head-end 1002. In the embodiment shown in FIG. 11, line neighborhood equipment 1004 includes a processor 1114, a multiplexer 1116, an encryptor 1118, a local delivery system 1120, a controller 1122, a session manager (SM) 1124, an access manager (AM) 1126, and a bandwidth manager (BWM) 1128.

Figure 12:
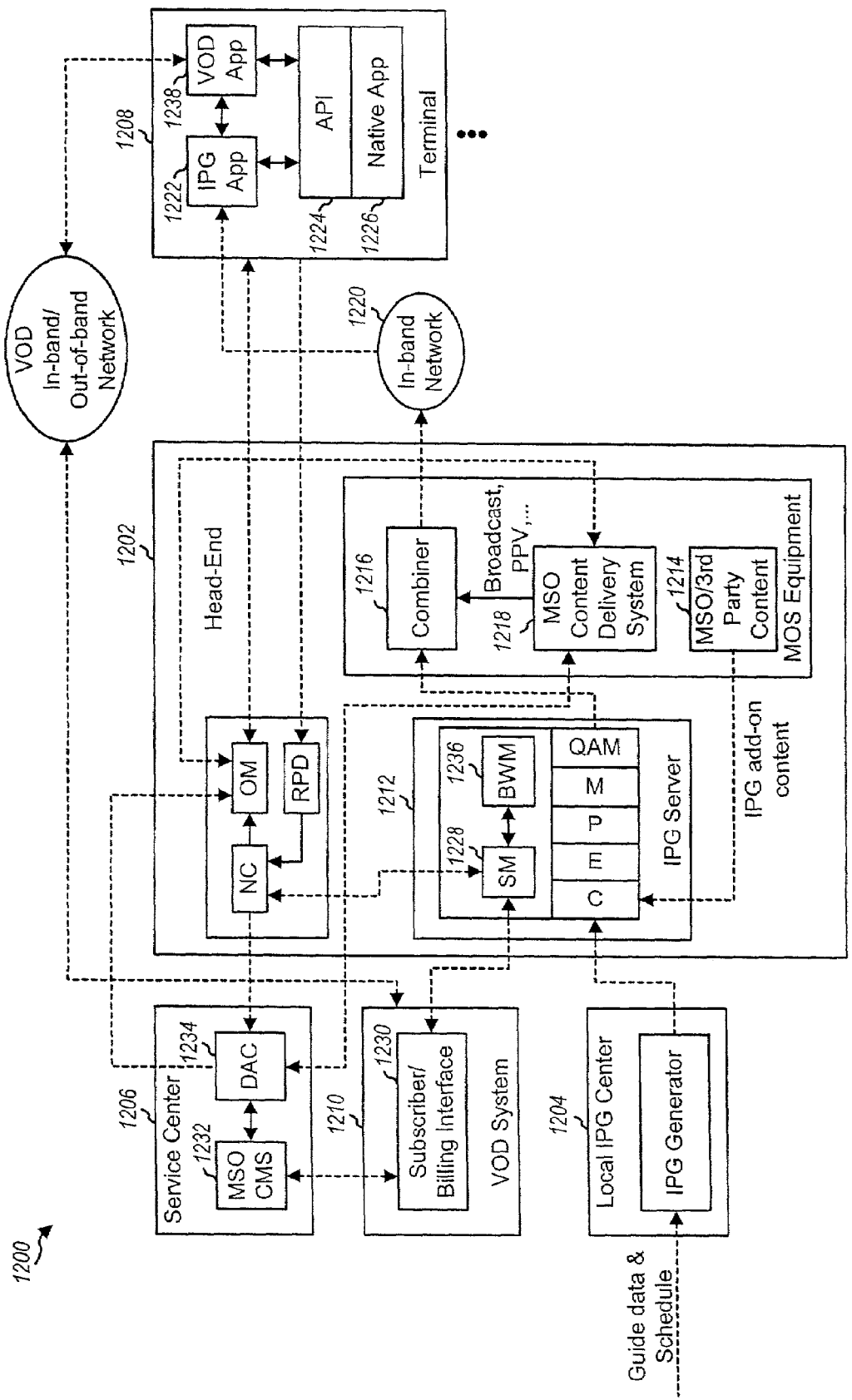

FIG. 12 is a diagram of a third architecture 1200 for managing delivery of video sequences of an interactive program guide in accordance with an embodiment of the invention. Third architecture 1200 includes a local IPG center 1204, a head-end 1202, a service center 1206, and a number of terminals 1208. In addition, the system may be integrated with a video-on-demand (VOD) system 1210 and a corresponding VOD application 1238 at terminal 1208. Third architecture 1200 does not support encryption of the IPG content.

Local IPG center 1204 generates guide page user interface (UI) screens and periodically sends the UI screens to an IPG server 1212 at head-end 1202. A multiple service operator (MSO)/third party IPG add-on content 1214 may be provided to IPG server 1212 from MSO equipment within head-end 1202. For example, the add-on content may include real-time advertisement video or HTML pages for electronic commerce.

IPG server 1212 composes (C), encodes (E), processes (P), multiplexes (M), and modulates (QAM) the IPG content (guide plus add-on content) and sends it to a combiner 1216. Combiner 1216 combines the IPG content with broadcast TV, premium content (e.g., HBO), pay-per-view (PPV), and other content from a multiple service operator (MSO) content delivery system 1218. The combined content is then broadcast to terminals 1208 via an in-band distribution network 1220.

Upon viewer tuning of terminal 1208 to an IPG channel, an IPG application 1222 at the terminal processes the IPG stream and provides the IPG via an application programming interface (API) 1224 to a "native" application 1226 running on the terminal. Native application 1226 decodes and presents the IPG to the viewer.

In one embodiment, the TV program guide for a current time period (1-hour) is broadcast to viewers. In addition, two weeks of look-ahead TV programming may be delivered to viewers on demand via demand-cast. Upon a viewer action of moving a cursor to a look-ahead time interval, the terminal sends a request via a back-channel to a session manager (SM) 1228 (e.g., via an out-of-band channel to a reverse path demodulator (RPD), then to a network controller (NC), then to session manager 1228). Session manager 1228 then causes IPG server 1212 to multiplex the requested IPG page into the IPG stream.

Session manager 1228 also interacts with a subscriber/billing interface 1230 in VOD system 1210 to coordinate access to VOD services from a link in the IPG user interface. The user interface also provides for access to premium content and pay-per-view purchasing by interaction through a two-way interface to an MSO customer management system (CMS) 1232 and digital access controller (DAC) 1234 in service center 1206. DAC 1234 generates digital encryption-related keys.

Third architecture 1200 also includes a bandwidth manager (BWM) 1236. As described above, bandwidth manager 1236 provides techniques to more efficiently utilize the limited bandwidth available for distribution of the IPG.

It can be noted that session manager 702 of FIG. 7 encompasses the functionality of a number of elements in FIG. 12, including session manager 1228 and bandwidth manager 1236. It can also be noted that transport stream generator 704 in FIG. 7 encompasses the functionality of a number of elements in FIG. 12, including the processor (P) and the multiplexer (M).

Figure 13:
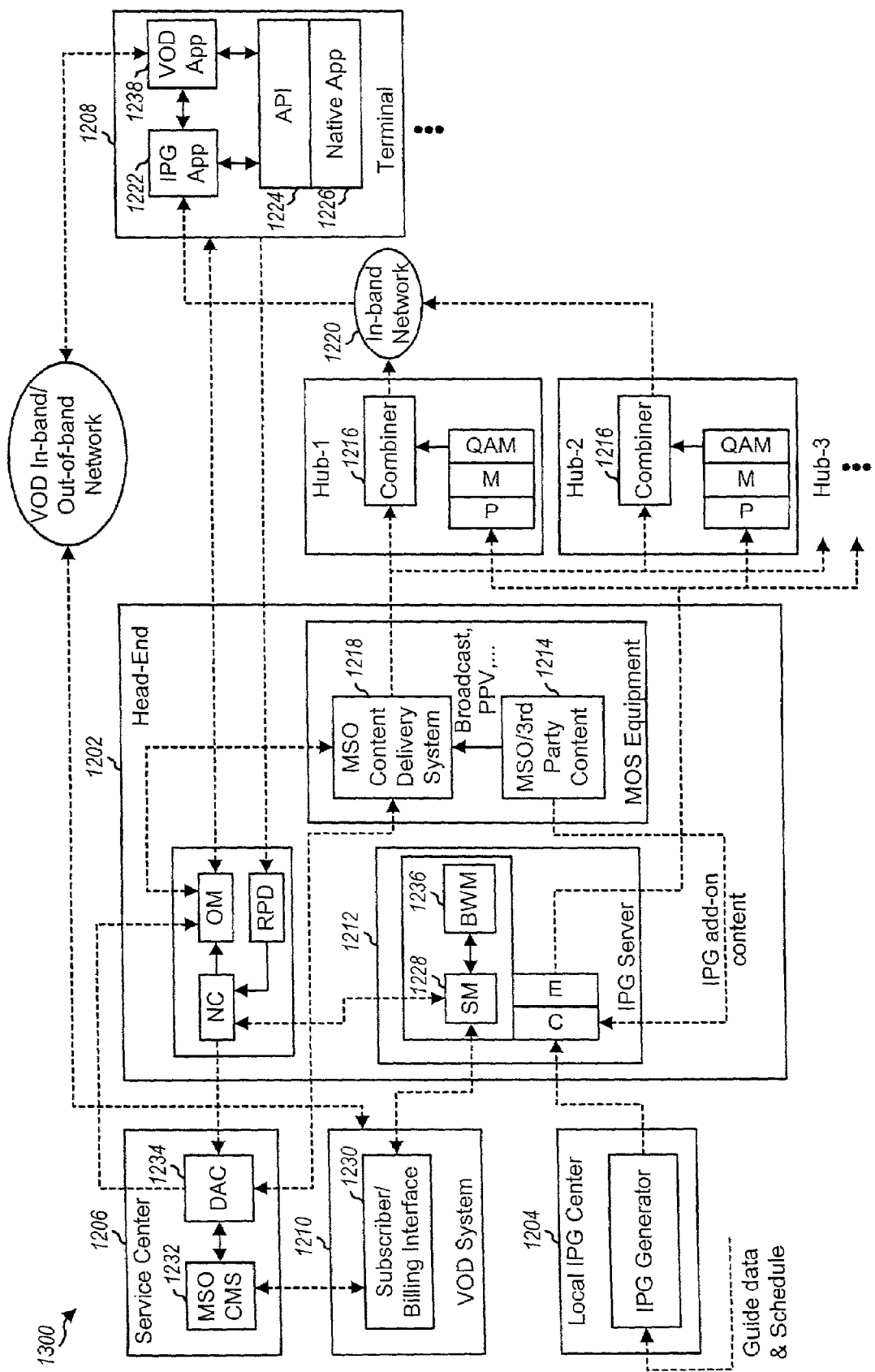

FIG. 13 is a diagram of a fourth architecture 1300 for managing delivery of video sequences of an interactive program guide in accordance with an embodiment of the invention. Fourth architecture 1300 in FIG. 13 is similar to third architecture 1200 in FIG. 12 and also does not support encryption of the IPG content.

Fourth architecture 1300 differs from third architecture 1200 primarily in that some of the elements are distributed from head-end 1202 to a number of hubs 1304 in the distribution system. In particular, combiner 1216, processor (P), multiplexer (M), and modulator (QAM) are moved from head-end 1202 to each hub 1304. Thus, the functionality of transport stream generator 704 is transferred to hubs 1304.

G. Messaging Protocol

A specific messaging protocol for communicating between the major components of the system is now described in relation to FIGS. 14A through 14D. Other messaging protocols can also be used and are within the scope of the invention.

In an embodiment, the "source" transport stream generator communicates with a terminal via, for example, a one-way in-band channel. The communication may be, for example, in the form of a "demand-cast index table" within a private section of the IPG MPEG transport stream.

FIG. 14A depicts an embodiment of the content of a demand-cast index table. The content may include: (a) a table version number (which increments when the table content changes); (b) a list of available demand-cast streams; (c) an internet protocol (IP) address for the source transport stream generator; (d) a MUX channel number within the source transport stream generator, and (e) a time of day and day of week.

In an embodiment, the terminal communicates with the session manager via, for example, a one-way out-of-band return path. The return path may be implemented, for example, using a user datagram protocol/internet protocol (UDP/IP) service to connect the terminal to a network controller (NC) at the session manager.

FIG. 14B depicts an embodiment of the contents of a message sent from the terminal to the session manager. The message content as shown includes: (a) a demand-cast stream identification; (b) the terminal's identification; (c) the IP address of the source transport stream generator; (d) the MUX channel number within the source transport stream generator; and (e) the message information itself. The message information may indicate: (1) an acquisition of the demand-cast stream by the terminal; (2) a release of the demand-cast stream by the terminal; or (3) a request for the demand-cast stream by the terminal.

In an embodiment, the session manager communicates with the source transport stream generator via, for example, a two-way communications channel. The two-way communications channel may comprise, for example, a TCP/IP connection over an Ethernet network.

FIG. 14C depicts an embodiment of the contents of a message sent from the session manager to the transport stream generator. The message content as shown includes: (a) the demand-cast stream identification; (b) the MUX channel number within the source transport stream generator; and (c) a particular message/command selected from a set of possible messages/commands. The set of messages/commands include: (1) demand-cast stream released (no longer acquired by any terminal); (2) demand-cast stream requested; and (3) a reset command.

Messages from the session manager to the transport stream generator may be acknowledged by the transport stream generator.

FIG. 14D depicts an embodiment of the contents of an acknowledgement message sent by the transport stream generator back to the session manager. An acknowledgement message as shown includes: (a) the demand-cast stream ID; (b) the MUX channel number; (c) the transport stream generator's IP address; and (d) the acknowledgement itself. The acknowledgement may acknowledge (1) release of the demand-cast stream; (2) request for the demand-cast stream; or (3) reset of the transport stream generator.

H. Stream Status and Conversions of Status

The following relate to stream status and conversions of status in accordance with a specific embodiment of the invention. Other stream statuses and conversions of status can also be implemented and are within the scope of the invention.

1. Stream Status within IPG Multiplex

The transport stream generator models bandwidth usage for each IPG multiplexed transport stream that it is managing. Each demand-cast stream within each transport stream may be either active or inactive. Active streams are currently being multiplexed into the transport stream, and inactive streams are not currently being multiplexed into the transport stream.

FIG. 15 depicts an example showing statuses of a number of active demand-cast streams in an IPG multiplex within a transport stream generator. For each demand-cast stream, the transport stream generator assigns a status with respect to the stream's intended multiplex. Demand-cast stream statuses, in context of the transport stream generator, are:

1) "active" streams are in the IPG multiplex
   1.1) "acquired" demand-cast streams are in the multiplex but are used by at least one terminal. They are referenced in the demand-cast index table in the private section of the IPG transport stream. They are not candidates for removal.
   1.2) "released" demand-cast streams are in the multiplex and are not used by any terminal. They are referenced in the demand-cast index table. They can become "passive".
      1.2) "passive" demand-cast streams are also technically "released". They are in the multiplex but are not used by any terminal. They are not referenced in the demand-cast index table. They are typically a small fraction of the "released" demand-cast streams. A few oldest 'released' demand-cast streams are forced to the "inactive" status by a maintenance thread. They are candidates for removal.

2) "inactive" demand-cast streams are not in the IPG multiplex. They are not referenced in the demand-cast index table. They may be inserted in the multiplex Note that the transport stream generator may remove all the "passive" demand-cast streams from their respective IPG multiplexes and replace them with null packets. It may be advantageous to leave "passive" demand-cast streams in the multiplex in case a terminal requests it, in which case the latency will be minimized.

2. Conversions of Status

The transport stream generator receives messages from the session manager. Messages received from the session manager are:

1) "request demand-cast stream"
2) "release demand-cast stream" The "release demand-cast stream" message includes the maximum number of terminals that were registered to the demand-cast stream.
3) "reset"

A. Transport Stream Generator Request Demand-Cast Stream

Figure 16A:
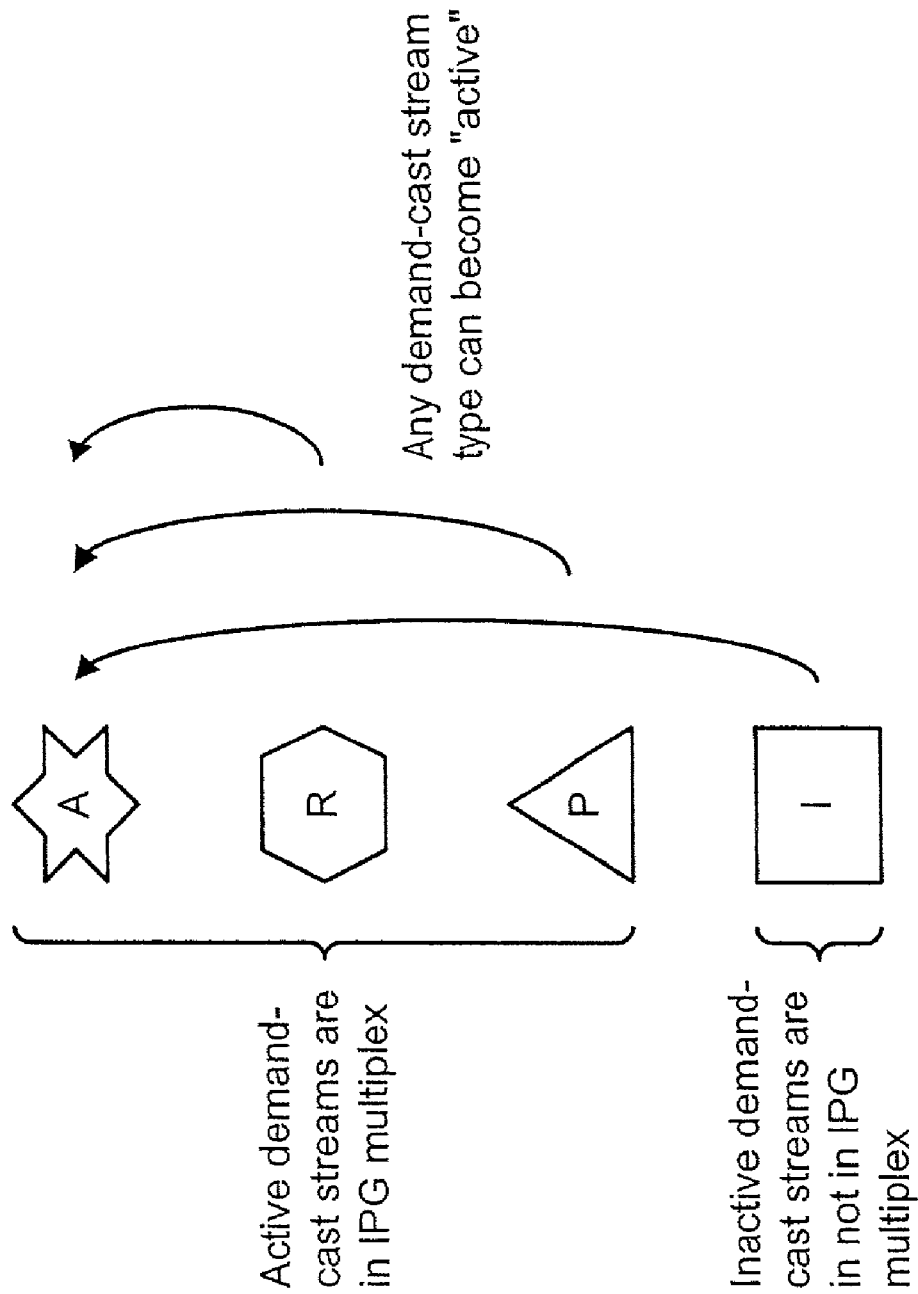
FIGS. 16A and 16B are diagrams illustrating various scenarios for activation and release of a demand-cast stream.

FIG. 16A illustrates the various methods for activating a demand-cast stream. If the transport stream generator receives a "request demand-cast stream" message from the serial number, then the following methods for activating the stream are possible.

1) If the demand-cast stream is currently "inactive", then
    a) In a first case, if there are one or more "passive" demand-cast streams in the corresponding multiplex, then the transport stream generator removes a "passive" demand-cast stream from the multiplex, and replaces it with the new requested demand-cast stream. The transport stream generator adds reference to the new 'active' demand-cast stream in the demand-cast index table. The transport stream generator assigns the status 'active' to the newly inserted demand-cast stream. The transport stream generator acknowledges the session manager for the "request demand-cast stream" message by sending a "success" message back to the session manager.
    b) In a second case, if there are no "passive" demand-cast streams in the corresponding multiplex, but a 'released' demand-cast stream is included therein, then the transport stream generator forces the oldest 'released' demand-cast stream to the "inactive" status and then follows the steps described above for the first case.
    c) In a third case, if the transport stream generator finds no "passive" or "released" demand-cast stream in the corresponding multiplex, it can not fulfill the request. The transport stream generator acknowledges the session manager for the "request demand-cast stream" message by sending a "fail" message back to the session manager.

2) If the demand-cast stream is currently 'released' or 'passive', then
   a) The transport stream generator changes the status of the 'released' or 'passive' demand-cast stream to 'acquired.' The transport stream generator also acknowledges the session manager for the "request demand-cast stream" message by sending a "success" message back to the session manager.

B. Transport Stream Generator Release Demand-Cast Stream

If the transport stream generator receives a "release demand-cast stream" message from the session manager, then it acknowledges the session manager by sending a "success" message. If the demand-cast stream is currently 'acquired', then the transport stream generator changes the status of the stream to 'released.'

C. Released Stream to Passive Stream Conversion

Removal of a 'released' demand-cast stream can be done. However, such removal, unless necessary, may be disadvantageous. Initially, the reference to the 'released' demand-cast stream is removed from the "demand-cast index table", then a short time later (e.g., few seconds) later the stream can be physically removed from the multiplex. This delay between the removal from the table and the removal from the multiplex prevents a race condition whereby a terminal is acquiring a demand-cast stream while the transport stream generator is in the process of removing it. Therefore, only 'passive' streams are removed in accordance with an embodiment of the invention.

The ratio of 'passive' to 'released' demand-cast stream may be specified in the transport stream generator configuration file. It may be maintained as a percentage (e.g., 10% of 'released' streams are converted to 'passive') or it can be maintained as an absolute number (e.g., so as to ensure that there are usually two or three 'inactive' demand-cast streams).

Figure 16B:
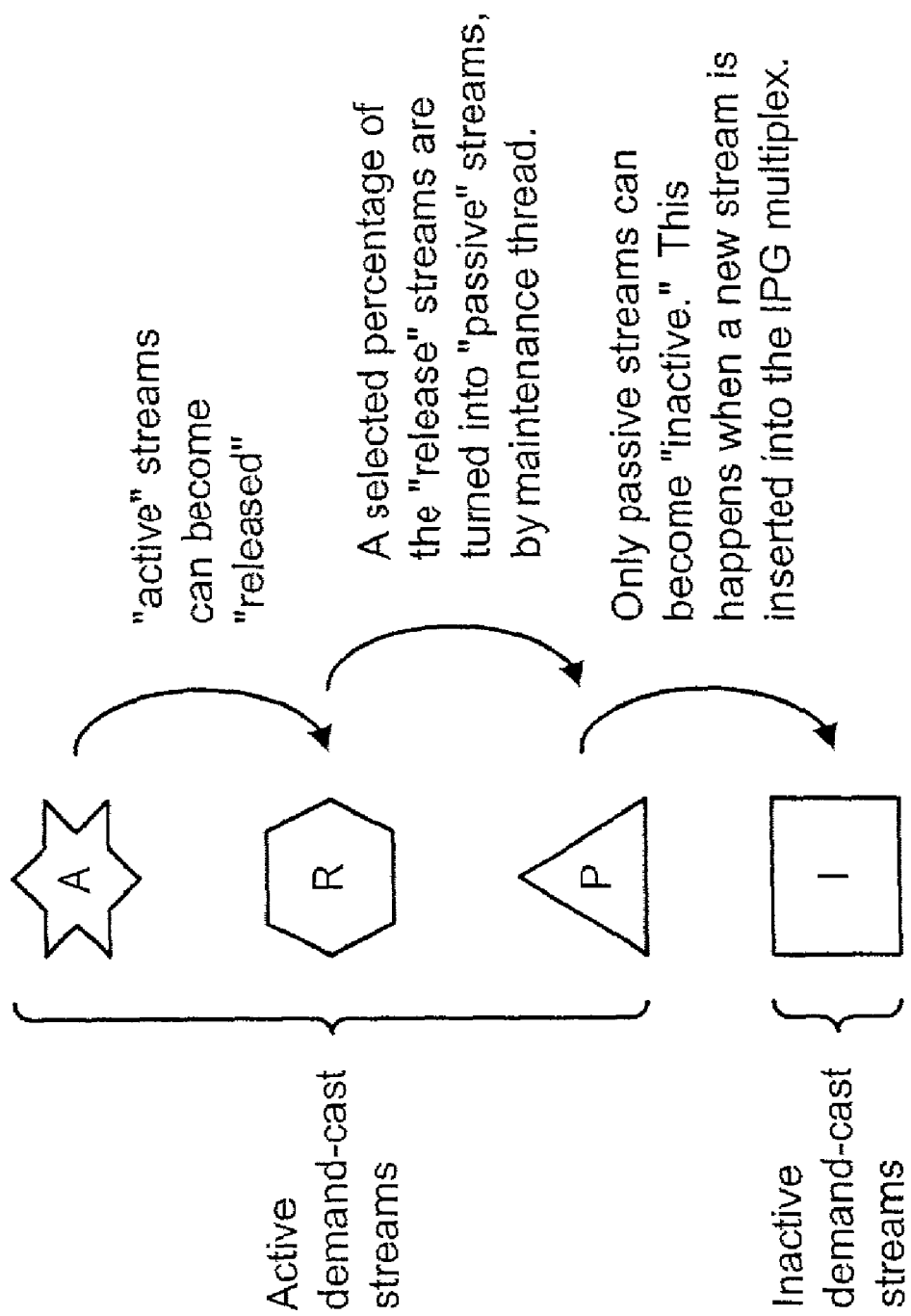

FIG. 16B illustrates an overall process by which a released stream may be converted to a passive stream. Methods for determining which released streams are converted to passive streams include an aging method and a statistical method. In the aging method, the few oldest 'released' demand-cast streams are continually converted to 'passive' status by a maintenance thread. In the statistical method, the "release demand-cast stream" messages include statistical data regarding the demand-cast stream. This data may provide the maximum number of terminals that were on a released stream before it was released. The transport stream generator converts demand-cast streams that have had the least amount of users to 'passive' status.

I. Other Technical Aspects

The following are further technical aspects in accordance with a specific embodiment of the invention. Other variations are also possible and within the scope of the invention.

1. Initial Conditions

Set Top Terminal: When the STT launches the IPG application, it tunes to the QAM carrying the IPG transport stream. When the STT requests its first demand-cast stream, it opens the IPG channel with the session manager. When the QAM is tuned, the STT acquires the demand-cast index table and sends an "Init" command to the session manager.

Session Manager: Initially, the session manager has no knowledge of the IPG multiplex fed to its client STTs. Upon receiving a first "request demand-cast stream" message from a STT, the session manager verifies that it is aware of the MUX ID. MUX ID includes the transport stream processor IP address and MUX channel within the transport stream generator. If the session manager is aware, then nothing happens. And if the session manager is not aware, the transport stream generator opens a communication socket with the source transport stream generator. The session manager maintains a log where it registers all MUXes that it controls. For each MUX in the log, the transport stream generator's IP address and MUX channel number is recorded.

Transport Stream Generator: Initially, the transport stream generator is configured through its own configuration file. Configuration includes the number of demand-cast streams that can be supported by each IPG multiplex. The absolute number of 'passive' streams or the ratio of 'passive' streams to 'released' streams is specified in the configuration file 2. Reset Set Top Terminal: When the STT does not "see" the PID of the demand-cast stream it is acquiring in the demand-cast index table, it acquires a default IPG broadcast PID. If the STT does not see the demand-cast index table, the STT exits the IPG application.

Session Manager: If the session manager is down, upon reset, it looks up transport stream generator log file and sends a reset command to the transport stream generator.

Transport Stream Generator: When the transport stream generator receives a "Reset" command from the session manager, it removes reference to all demand-cast streams in the demand-cast index table in the multiplex referenced by the MUX ID in the reset command. Then a short time (e.g., a few second) later, the transport stream generator removes all the demand-cast streams within the multiplex.

3. Scalability

Set Top Terminal: STT messages regarding demand-cast streams include demand-cast stream ID, transport stream generator's IP address, and the MUX channel number on the transport stream generator.

Session Manager: The session manager can manage more than one transport stream generator. Each IPG multiplex is referred to by the IPG address of the host transport stream generator and the MUX channel number on the transport stream generator.

Transport Stream Generator: Each transport stream generator can manage more than one IPG multiplex.

J. Efficient Delivery of IPG Using Demand-Cast

As described in the attached Exhibit A, the interactive program guide (IPG) can include many pages of guide listing. If each IPG page covers a short time period and includes guide listing for a limited number of channels, then a large number of pages are needed to provide program guide for a large number of channels for an extended time period. For example, 6720 pages would be needed for 200 channels for a two-week period if each page covers 1-hour and includes guide listing for 10 channels. To transmit all these IPG pages at all times would require a large amount of bandwidth. Thus, to efficiently utilize the available bandwidth, only a small fraction of all IPG pages is continually transmitted via broadcast. For example, IPG pages for the current time slots and possibly the near look-ahead and/or the prime time periods (defined in Exhibit A) may be continually transmitted. Program guide for other time periods may be transmitted, for example, as requested by viewers via demand-cast.

In a demand-cast system described above, a particular (non-broadcast) IPG page for a specific time period and group of channels is sent by the head-end whenever requested by a viewer. The requested IPG page may be sent to the entire neighborhood where the requesting viewer is located. Other viewers in the neighborhood are able to access the transmitted IPG page. As part of the implementation of the demand-cast system described above, the head-end (or more specifically, a session manager within the head-end) tracks the status of the IPG pages being demand-casted. For example, for each demand-casted page, the head-end may track whether the page is currently being accessed by one or more viewers, when it was last accessed, and so on. In the demand-cast implementation described above, a demand-casted IPG page is continually transmitted until no viewers access the page. When the demand-casted page is no longer accessed, the page can be tear down so that the bandwidth can be made available for another IPG page.

In a typical distribution system, such as a cable distribution system, one or more final transport streams are used to serve each neighborhood. Each neighborhood may include a number of terminals (e.g., thousands). As the number of terminals in a neighborhood increases, and especially during periods of heavy activity (e.g., during the prime time period), many viewers may be requesting IPG pages. As the number of requests increases, blockage may occur if the system is unable to serve the viewer demands (e.g., because of lack of bandwidth in the transport stream).

In accordance with an aspect of the invention, techniques are provided to efficiently and effectively deliver interactive program guide in a server-centric distribution system. The delivery techniques of the invention exploit known characteristics of the IPG pages and the temporal persistence decoding techniques described in Exhibit A to minimize the transmission of redundant information, as described in further detail below.

Figure 17:
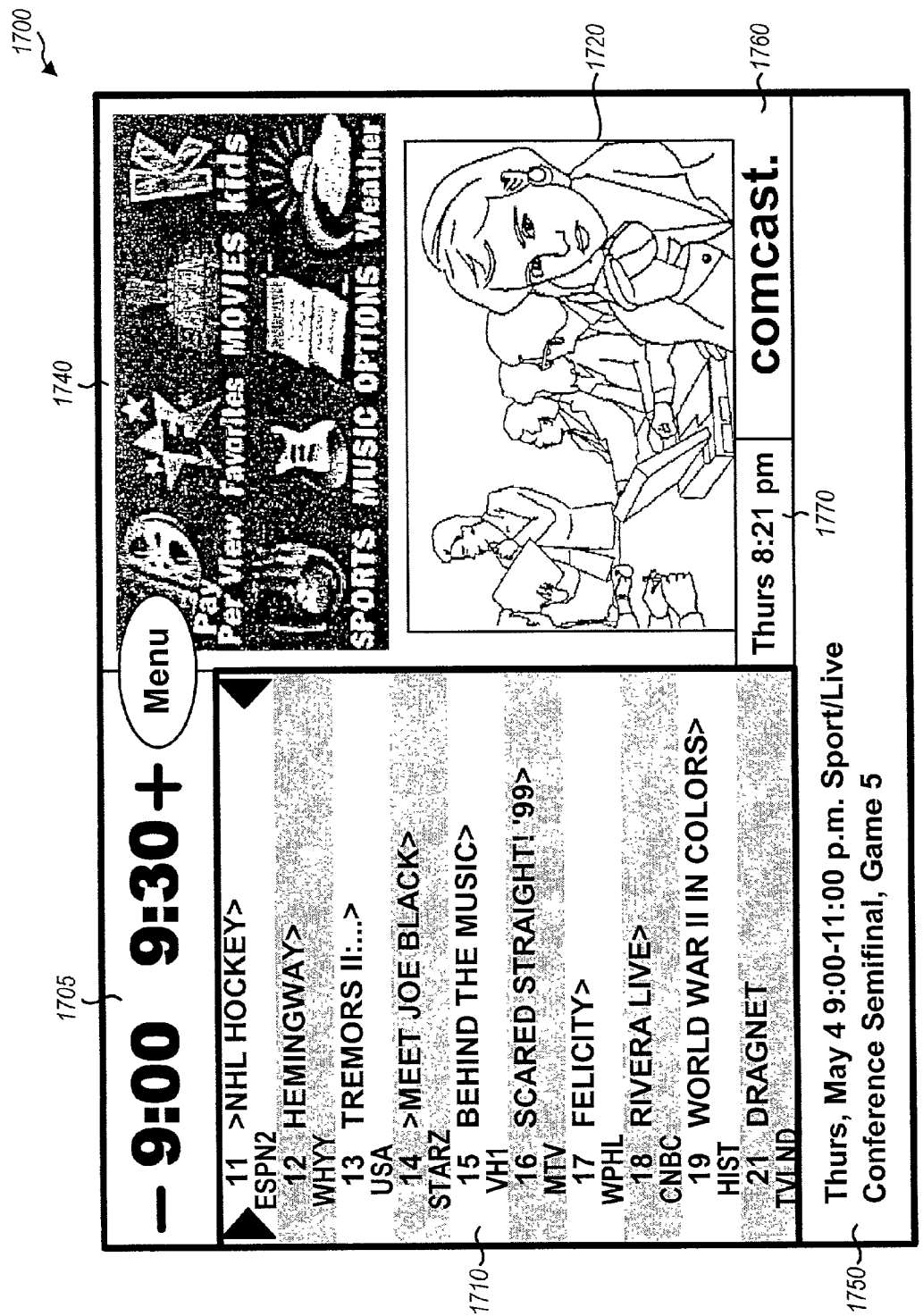
FIG. 17 is a diagram of an IPG page in accordance with an embodiment of the invention.

FIG. 17 is a diagram of an IPG page 1700 in accordance with an embodiment of the invention. IPG page 1700 is made up of a number of regions including a time slot region 1705, a guide region 1710, a program description region 1750, a filter object region 1740, a video region 1720, a logo region 1760, and a time-of-day region 1770. In a specific implementation, program description region 1750, filter object region 1740, video region 1720, logo region 1760, and time-of-day region 1770 are common for the IPG pages, and are collectively referred to herein as the "background portion" of the IPG page. The information specific to each IPG page is the guide listing (i.e., the guide portion) in guide region 1710.

Figure 18:
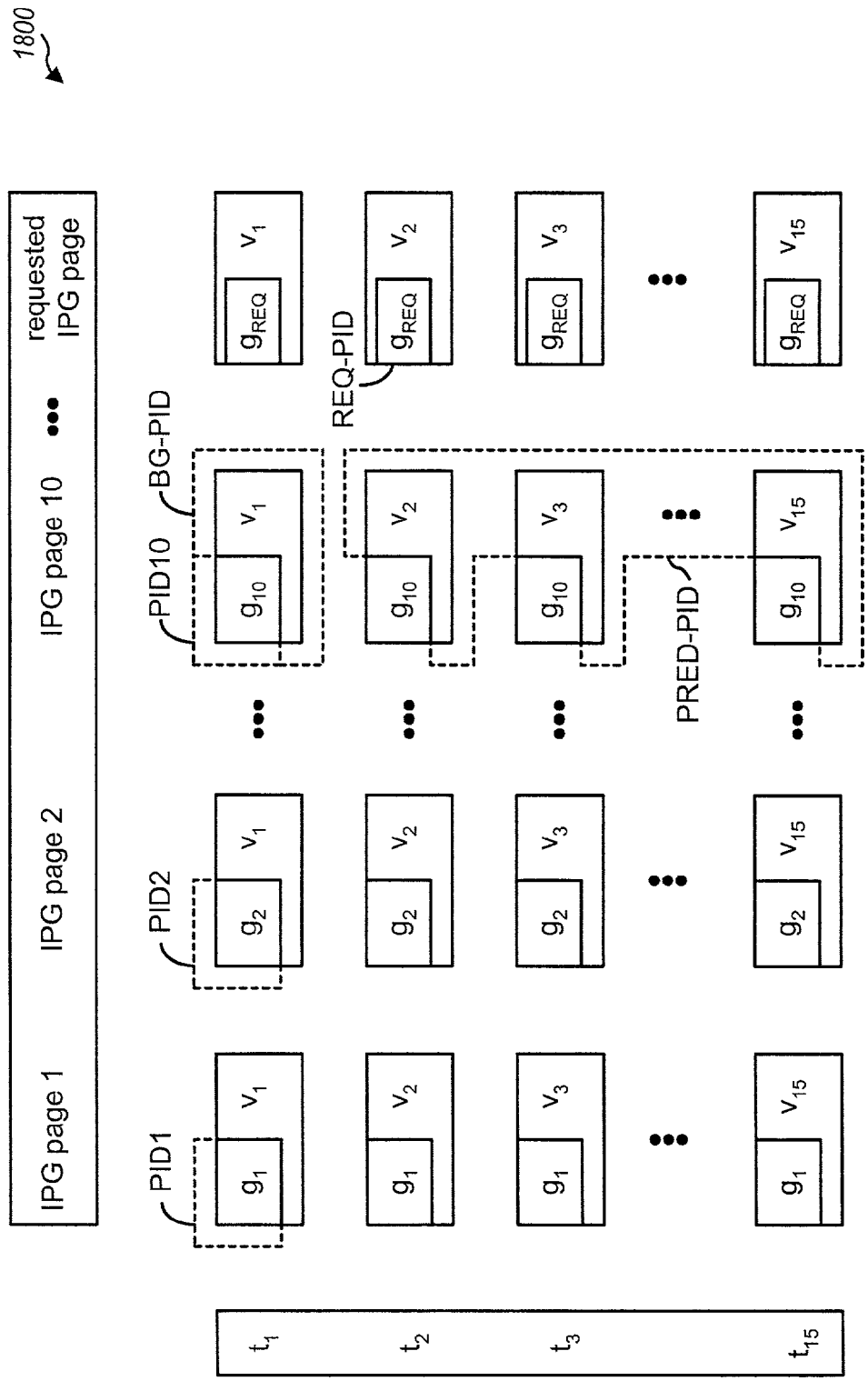
FIG. 18 is a diagram of a matrix representation of program guide data for a number of IPG pages.

FIG. 18 is a diagram of a matrix representation 200 of program guide data for a number of IPG pages. As shown in FIG. 18, each IPG page is composed of a sequence of pictures, with every (illustratively) 15 pictures forming a GOP. The IPG pages share a common background portion, which changes for each time period in the GOP from $t_1$ through $t_{15}$. However, each IPG page includes a different guide portion, as indicated in FIG. 18.

Discussion of various encoding schemes for optimally minimizing the redundant data can be found in Exhibit A, and in application Ser. No. 09/384,394, entitled "METHOD AND APPARATUS FOR COMPRESSING VIDEO SEQUENCES," filed Aug. 27, 1999, and Ser. No. 09/428,066 filed Oct. 27, 1999, entitled "METHOD AND APPARATUS FOR TRANSMITTING VIDEO AND GRAPHICS IN A COMPRESSED FORM." As discussed in Exhibit A, for a requested demand-cast guide page, it is sufficient to send only the guide portion to the set top terminal as shown in REQ-PID in FIG. 18. The set top terminal receives the guide portion in a separate PID and updates the guide portion of the IPG on the screen.

Sending the requested guide portion a limited number of times for each viewer request can greatly reduce the load for demand-cast. If the requested guide portion is sent periodically (e.g., once for each GOP) for the entire time the requested IPG page is accessed, then a larger portion of the available system resources (e.g., bandwidth) is needed to support demand-cast IPG. For example, if the average viewing time for a demand-casted IPG page is 10 seconds and if the requested guide portion is transmitted once for each GOP, then 20 guide portions or pages are transmitted for the average demand-cast. This represents a 20-fold increase in bandwidth needed to support continual transmission of the requested guide portion than if it was transmitted just once. As the number of terminals to be served by each node increases, the demands for demand-cast will increase correspondingly. Continual transmission of the requested guide portion may overload the capacity of the distribution system to a point where it may experience blockage (i.e., the inability to send the requested IPG page due to lack of available system resources), which is a highly undesirable condition.

1. Request Processing and Head-End to Set Top Terminal Message Exchange

To conserve bandwidth and reduce the number of IPG pages to transmit, the head-end may continually broadcast only a fraction of the available interactive program guide (e.g., IPG pages for the current time slots and possibly the near look-ahead and/or prime time periods). The broadcasted IPG pages can be appropriately identified in a program mapping table (PMT), and can be accessed by any terminal at any time.

When a terminal receives a request from a viewer for a new IPG page, the terminal determines whether the requested page is currently being transmitted by the head-end. This can be achieved by consulting the PMT. If the requested IPG page is not currently transmitted, the terminal sends a request message to the head-end (or more specifically, the session manager within the head-end). The request message can have the format described above. The head-end receives and processes the request from the terminal. The requested IPG page is then encoded (if it has not already been encoded) and can be transmitted in a manner described below and in Exhibit A.

For a demand-cast system that continually transmits the requested IPG page (e.g., such as the one described above), the head-end needs to track the status of each demand-casted IPG page and determine whether any terminal is accessing the page so that unaccessed pages can be tear down so that the bandwidth becomes available for other requested IPG pages. For this "continual transmit" demand-cast system, the head-end needs to properly manage the demand-cast to effectively and efficiently serve the viewers' requests. For example, for this system, the head-end may keep track of when each requested IPG page was last accessed, which IPG pages are most frequency accessed, and so on, so that the least popular and/or oldest IPG pages not currently being accessed can be tear down first.

In contrast, in accordance with the invention, since the requested IPG page is transmitted a limited number of times (e.g., once) as a demand-cast in response to a viewer's request, the head-end does not need to track the request or the demand-cast. Once processed, the head-end can simply remove the request. This can greatly simplify the management for demand-cast.

In one embodiment, after receiving a page request, the head-end sends the requested guide PID to the set top terminal (or to the neighborhood) only once.

In another embodiment, after receiving a page request, the head-end sends the requested guide PID to the set top terminal (or to the neighborhood) multiple times (two or more) until an acknowledgement message is received from the set top terminal confirming the reception of the requested guide PID.

In yet another embodiment, after receiving a page request, head-end sends the requested guide PID to the set top terminal once and waits for the acknowledgement message. If the acknowledgement message is not received within a particular time period, the head-end sends the requested guide PID one more time.

In yet another embodiment, after receiving a page request, the head-end sends the requested guide PID to the set top terminal once. If the set top terminal does not receive the requested PID within a certain time period, e.g. 1 second, the set top terminal sends another guide request (which is different than an acknowledgement) to the head-end.

The above messaging embodiments, along with the temporal slice persistence encoding scheme presented in Exhibit A and the demand-cast system presented described above provides a bandwidth efficient and low latency end-to-end demand-cast delivery system.

2. PID Assignment

Each requested guide portion is processed and assigned a particular PID (e.g., REQ-PID) by the head-end. Since the requested guide portion is transmitted only a limited number of times in accordance with an embodiment of the invention, the requesting terminal needs to be aware of the identify of the particular PID being used, and to be ready to retrieve that PID when it is sent by the head-end. A number of PID assignment schemes can be used to assign PID for the requested IPG page.

In a first PID assignment scheme, each terminal in a neighborhood is associated with, or assigned a unique PID for delivery of IPG pages via demand-cast. Whenever a terminal requests a particular IPG page, the requested guide portion is assigned the unique PID previously assigned to that terminal. Each terminal only process the PIDs identified in the program mapping table for broadcast IPG and its own assigned PID for demand-cast IPG. If there are many terminals in the neighborhood, multiple transport streams can be used to provide a sufficient number of PIDs for assignment to the terminals for demand-cast and to provide the necessary bandwidth, as described in U.S. patent application Ser. No. 09/679,210, entitled "METHOD AND SYSTEM FOR MULTICAST USING MULTIPLE TRANSPORT STREAMS," filed Oct. 4, 2000, assigned to the assignee of the invention and incorporated herein by reference.

In a second PID assignment scheme, the PID to be used for a requested IPG page is signaled to the terminal via either an in-band or out-of-band network. Upon sending the request, the terminal listens for a message identifying the particular PID that will be used for the requested IPG page. Once that PID is known, the terminal retrieves packets with that PID.

The second scheme allows a limited number of PIDs to support a large number of terminals since the PIDs can be shared (i.e., reused) among terminals. After a particular PID has been assigned and transmitted, that PID is available for re-assignment to another requested IPG page. To avoid erroneous reception of demand-casted IPG pages by the terminals, a mechanism can be employed whereby a PID is "aged" for a particular period of time (e.g., 10 seconds) before it is re-assigned to another terminal for another requested IPG page. This aging can be used to account for processing and transmission delays and/or timing variations among terminals.

In a third PID assignment scheme, the PID to be used is computed by both the requesting terminal and the head-end based on a particular computation scheme. The PID generation can be based on a set of parameters selected to provide a pseudo-random PID within a range of PIDs allocated for demand-cast. For example, the parameters may include the serial number of the requesting terminal, the time of the day the request was generated, and so on. In case of collision (i.e., two or more terminals deriving the same PID for their requested IPG pages), the terminals can regenerate the requests and resend them to the head-end.

In a fourth PID assignment scheme, PIDs are assigned to "active" terminals for demand-cast IPG. For example, when a terminal first requests an IPG page, a PID is assigned to the terminal and used for the duration of the session. If a request is not received from the terminal for a particular period of time (e.g., 10 minutes), the session can time-out and the assigned PID can then be re-assigned to another active terminal.

Other schemes to assign PIDs for the requested IPG pages can also be contemplated and are within the scope of the invention.

3. Advantages of Demand-Cast System

The above-described demand-cast system for delivering IPG pages provides many advantages. First, the bandwidth required to support demand-cast is significantly reduced since each requested IPG page is only sent a limited number of times (e.g., only once). This allows a distribution system with a given capacity to support a larger number of terminals and further reduces the likelihood of blockage. Second, the above-described demand-cast system may reduce the management required at the head-end. Since each request is processed as it is received, the head-end does not need to keep track of the status of demand-casted IPG pages (e.g., which pages are currently being send and which pages are currently accessed).

4. Other Applications for Demand-Cast System

The above-described demand-cast system is especially suited for interactive program guide, which is commonly used for television and broadcast distribution systems. However, the demand-cast system can also be advantageously used for other guide applications such as, for example, dining guide, local shopping, news, and others. In general, the demand-cast system can be used to deliver any picture that includes a background portion common with at least one other pictures and a "custom" portion different from other pictures. The background portion can be (continually) sent as one stream, and the custom portion can be sent as a separate stream when requested. For example, the techniques of the invention can be used to deliver stock quotes, sports scores, headline news, traffic reports, other guides, and so on.

The foregoing description of the preferred embodiments is provided to enable any person skilled in the art to make or use the invention. Various modifications to these embodiments will be readily apparent to those skilled in the art, and the generic principles defined herein may be applied to other embodiments without the use of the inventive faculty. Thus, the invention is not intended to be limited to the embodiments shown herein but is to be accorded the widest scope consistent with the principles and novel features disclosed herein.

What is claimed is:

1. A method for providing program data, comprising:
broadcasting from a head-end less than the total number of available interactive program guide (IPG) pages, each IPG page being transmitted as an encoded video stream having a respective packet identifier (PID);
receiving, by the head-end from a terminal, a request message for a requested IPG page, the requested IPG page not being one of the transmitted IPG pages;
encoding, by the head-end, only a guide portion of the requested IPG page using a temporal slice persistence encoding scheme, the requested IPG page including the guide portion and a background portion;
assigning, by the head-end, a particular packet identifier (PID) to the encoded guide portion; and in response to the request message demand-casting, by the head-end to the terminal, only the encoded guide portion a limited number of times in a non-continual manner.

2. The method of claim 1, wherein the encoded guide portion of the requested IPG page is sent once in response to receiving the request message.

3. The method of claim 1, further comprising:
waiting for an acknowledgement indicating that the guide portion of the requested IPG page has been received; and
upon receiving the acknowledgement, terminating the sending of the encoded guide portion of the requested IPG page.

4. The method of claim 1, wherein the encoded guide portion of the requested IPG page is sent once initially in response to receiving the request message, the method further comprising:
waiting for an acknowledgement indicating that the guide portion of the requested IPG page has been received; and
if the acknowledgement is not received within a particular time period, resending the encoded guide portion of the requested IPG page a limited number of times.

5. The method of claim 4, wherein the encoded guide portion of the requested IPG page is resent once in response to not receiving the acknowledgement within the particular time period.

6. The method of claim 1, wherein the encoded guide portion of the requested IPG page is sent once initially in response to receiving the request message, the method further comprising:
receiving a second request message from the terminal for the requested IPG page; and
resending the encoded guide portion of the requested IPG page a limited number of times in response to receiving the second request message.

7. The method of claim 1, wherein the particular PID used for the encoded guide portion of the requested IPG page is a PID assigned to the terminal for IPG delivery.

8. The method of claim 1, further comprising:
signaling, by the head-end to the terminal, the identity of the particular PID used for the guide portion of the requested IPG page.

9. The method of claim 8, wherein the signaling is achieved via an in-band channel.

10. The method of claim 8, wherein the signaling is achieved via an out-of-band channel.

11. The method of claim 1, wherein the particular PID used for the guide portion of the requested IPG page is computed based on a particular computation scheme.

12. The method of claim 1, wherein the particular PID used for the guide portion of the requested IPG page is a PID assigned to the terminal for a duration of a communication session with the terminal.

13. A method for receiving program data comprising:
receiving a broadcast at a terminal from a head-end, less than the total number of available interactive program guide (IPG) pages, each IPG page being transmitted as an encoded video stream having a respective packet identifier (PID);
sending, from the terminal to the head-end, a request message for a requested IPG page, the requested IPG page not being one of the transmitted IPG pages;
in response to the request message receiving, at the terminal from the head-end, a transmission of a guide portion of the requested IPG page, wherein only the guide portion of the requested IPG page is transmitted a limited number of times in a non-continual manner in response to the request message; and
regenerating the requested IPG page from the received transmission, the requested IPG page including the guide portion and a background portion.

14. The method of claim 13, further comprising:
sending an acknowledgement to the head-end upon receiving the transmission for the guide portion of the requested IPG page.

15. The method of claim 13, further comprising:
if the guide portion of the requested IPG page is not received within a particular time period after sending the request message, resending the request message to the head-end for the requested IPG page.

16. The method of claim 13, wherein the transmission is assigned a particular packet identifier (PID) at the head-end.

17. The method of claim 16, wherein the particular PID used for the transmission is a PID assigned to the terminal for IPG delivery.

18. The method of claim 16, further comprising:
receiving a message from the head-end indicating the particular PID assigned for the transmission of the guide portion of the requested IPG page.

19. A system for providing program data, comprising:
a video encoder operative to encode a number of broadcast interactive program guide (IPG) pages and a guide portion of a requested IPG page using a temporal slice persistence encoding scheme, and to respectively generate a broadcast guide stream and a requested guide stream each having a respective packet identifier (PID), the broadcast IPG pages being less than a total number of available IPG pages, the guide portion of the requested IPG page not being one of the broadcast IPG pages, and the requested IPG page including the guide portion and a background portion;
a transport multiplexer coupled to the video encoder and operative to receive and multiplex the broadcast guide stream and the requested guide stream into a transport stream; and
a modulator coupled to the transport multiplexer and operative to receive the transport stream and generate an output signal suitable for transmission in response to the request message, demand-casting, by the head-end to the terminal, only the guide portion a limited number of times in a non-continual manner.

20. The system of claim 19, further comprising:
a session manager operative to receive a request message for the requested IPG page and direct the transport multiplexer to multiplex the requested guide stream into the transport stream.

21. The system of claim 20, wherein the session manager is further operative to receive an acknowledgement indicating that the requested IPG page has been received and, in response, direct the transport multiplexer to stop multiplexing the requested guide stream into the transport stream.

* * * * *